(12) United States Patent
Sakakibara et al.

(10) Patent No.: US 12,038,557 B2
(45) Date of Patent: Jul. 16, 2024

(54) ANTI-REFLECTION FILM

(71) Applicant: DAICEL CORPORATION, Osaka (JP)

(72) Inventors: Takahiro Sakakibara, Tokyo (JP); Masashi Yokoyama, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/961,806

(22) PCT Filed: Jan. 21, 2019

(86) PCT No.: PCT/JP2019/001600
§ 371 (c)(1),
(2) Date: Jul. 13, 2020

(87) PCT Pub. No.: WO2019/181165
PCT Pub. Date: Sep. 26, 2019

(65) Prior Publication Data
US 2021/0072426 A1    Mar. 11, 2021

(30) Foreign Application Priority Data
Mar. 20, 2018    (JP) .................................. 2018-051990

(51) Int. Cl.
*G02B 1/111*    (2015.01)
*B32B 7/022*    (2019.01)
(Continued)

(52) U.S. Cl.
CPC ............... *G02B 1/111* (2013.01); *G02B 1/14* (2015.01); *B32B 7/022* (2019.01); *B32B 7/023* (2019.01);
(Continued)

(58) Field of Classification Search
None
See application file for complete search history.

(56) References Cited

U.S. PATENT DOCUMENTS 10,377,919 B2    8/2019    Bae et al.
10,751,980 B2    8/2020    Sawamoto et al.
(Continued)

FOREIGN PATENT DOCUMENTS

EP    3 309 229 -1    4/2018
JP    2006-178276 A    7/2006
(Continued)

OTHER PUBLICATIONS

International Search Report dated Mar. 19, 2019 for Application No. PCT/JP2019/001600 with an English translation.
(Continued)

*Primary Examiner* — Vivian Chen
(74) *Attorney, Agent, or Firm* — Birch, Stewart, Kolasch & Birch, LLP

(57) ABSTRACT

An anti-reflection film (X) includes a laminated structure including a substrate (11), a hard coat layer (12), and an anti-reflection layer (13), and a luminous reflectance of the anti-reflection layer (13) side is 2% or less. A minimum value of a mandrel diameter indicating the bending resistance is in a range of 6 mm or less in a bending test according to a cylindrical mandrel method in which the test piece of the anti-reflection film (X) is bent with the anti-reflection layer (13) side inward. Additionally or alternatively, a minimum value of the mandrel diameter indicating the bending resistance is in a range of 10 mm or less in a bending test according to a cylindrical mandrel method in which the test piece of the anti-reflection film (X) is bent with the anti-reflection layer (13) side outward. Such an
(Continued)

anti-reflection film is suitable for achieving high bending resistance together with high anti-reflective properties.

19 Claims, 2 Drawing Sheets

(51) Int. Cl.
| | |
|---|---|
| *B32B 7/023* | (2019.01) |
| *B32B 27/08* | (2006.01) |
| *C08K 3/04* | (2006.01) |
| *C08K 3/36* | (2006.01) |
| *C09D 5/00* | (2006.01) |
| *C09D 183/00* | (2006.01) |
| *C09D 183/04* | (2006.01) |
| *C09D 183/06* | (2006.01) |
| *G02B 1/10* | (2015.01) |
| *G02B 1/14* | (2015.01) |

(52) U.S. Cl.
CPC .......... *B32B 27/08* (2013.01); *B32B 2255/10* (2013.01); *B32B 2255/26* (2013.01); *B32B 2255/28* (2013.01); *B32B 2307/412* (2013.01); *B32B 2307/418* (2013.01); *B32B 2307/536* (2013.01); *B32B 2307/584* (2013.01); *C08K 3/04* (2013.01); *C08K 3/36* (2013.01); *C09D 5/006* (2013.01); *C09D 183/00* (2013.01); *C09D 183/04* (2013.01); *C09D 183/06* (2013.01); *G02B 1/10* (2013.01)

(56) References Cited

U.S. PATENT DOCUMENTS

| | | | | |
|---|---|---|---|---|
| 10,988,607 | B2* | 4/2021 | Umemoto | C08F 292/00 |
| 11,372,138 | B2* | 6/2022 | Sakakibara | C08K 9/06 |
| 2006/0134400 | A1 | 6/2006 | Takada et al. | |
| 2007/0121211 | A1* | 5/2007 | Watanabe | G02B 5/0221 |
| | | | | 359/601 |
| 2007/0206286 | A1* | 9/2007 | Fukushige | G02B 1/111 |
| | | | | 359/580 |
| 2008/0113165 | A1* | 5/2008 | Watanabe | B32B 27/304 |
| | | | | 428/212 |
| 2009/0004478 | A1* | 1/2009 | Baetzold | C09D 175/16 |
| | | | | 264/269 |
| 2009/0081472 | A1 | 3/2009 | Watanabe et al. | |
| 2009/0297828 | A1* | 12/2009 | Shenderova | C09D 5/32 |
| | | | | 428/323 |
| 2010/0003501 | A1* | 1/2010 | Liu | G02B 1/111 |
| | | | | 428/327 |
| 2010/0062217 | A1* | 3/2010 | Kurematsu | B29C 59/04 |
| | | | | 264/129 |
| 2010/0112296 | A1* | 5/2010 | Yoshihara | G02B 5/0242 |
| | | | | 428/172 |
| 2012/0328829 | A1* | 12/2012 | Vang | C09D 5/006 |
| | | | | 428/141 |
| 2013/0177748 | A1* | 7/2013 | Hirai | B32B 27/283 |
| | | | | 428/203 |
| 2014/0248478 | A1* | 9/2014 | Saito | B29C 45/14811 |
| | | | | 428/313.9 |
| 2015/0017386 | A1* | 1/2015 | Kolb | G02B 1/118 |
| | | | | 428/149 |
| 2015/0159044 | A1 | 6/2015 | Bae et al. | |
| 2015/0177433 | A1* | 6/2015 | Kumagai | G02B 1/14 |
| | | | | 359/359 |
| 2015/0179674 | A1* | 6/2015 | Kim | G02F 1/133502 |
| | | | | 257/789 |
| 2016/0046830 | A1* | 2/2016 | Kim | C08G 77/045 |
| | | | | 522/170 |
| 2016/0103249 | A1 | 4/2016 | Sato et al. | |
| 2016/0200939 | A1* | 7/2016 | Cho | H01L 31/02168 |
| | | | | 252/301.36 |
| 2016/0297933 | A1* | 10/2016 | Kuwana | B32B 27/30 |
| 2017/0190843 | A1* | 7/2017 | Rathore | C08G 77/045 |
| 2017/0205701 | A1* | 7/2017 | Ide | G02B 5/0278 |
| 2017/0275426 | A1* | 9/2017 | Rathore | C08G 77/18 |
| 2018/0010012 | A1 | 1/2018 | Ahn et al. | |
| 2018/0094161 | A1* | 4/2018 | Lee | C09D 135/02 |
| 2018/0142128 | A1 | 5/2018 | Kikuchi | |
| 2018/0327634 | A1* | 11/2018 | Heo | C09D 7/40 |
| 2018/0334589 | A1* | 11/2018 | Lee | C09D 4/06 |
| 2019/0031874 | A1* | 1/2019 | Umemoto | C08K 9/06 |
| 2019/0217587 | A1 | 7/2019 | Sawamoto et al. | |
| 2020/0018886 | A1* | 1/2020 | Fattal | G02B 6/0036 |
| 2020/0192001 | A1* | 6/2020 | Sakakibara | G02B 1/14 |
| 2020/0282712 | A1* | 9/2020 | Sakakibara | G02B 1/111 |
| 2020/0347180 | A1* | 11/2020 | Egawa | C09D 133/14 |
| 2020/0371273 | A1* | 11/2020 | Hou | B32B 27/281 |
| 2021/0087429 | A1* | 3/2021 | Leppajarvi | C09D 183/06 |

FOREIGN PATENT DOCUMENTS

| | | | |
|---|---|---|---|
| JP | 2007-46031 A | | 2/2007 |
| JP | 2009-75417 A | | 9/2009 |
| JP | 2010-753 A | | 1/2010 |
| JP | 2010-92003 A | | 4/2010 |
| JP | 2010-191144 A | | 9/2010 |
| JP | 2010-215685 A | | 9/2010 |
| JP | 2012-150226 A | | 8/2012 |
| JP | 2014-016608 A | * | 1/2014 |
| JP | 2014-025061 A | * | 2/2014 |
| JP | 2015-1125990 A | | 6/2015 |
| JP | 2015-212353 A | | 11/2015 |
| JP | 2016-75869 A | | 5/2016 |
| JP | 2017-8148 A | | 1/2017 |
| JP | 2017-83803 A | | 5/2017 |
| JP | 2018-506617 A | | 3/2018 |
| WO | WO 2016/203957 A1 | | 12/2016 |
| WO | WO 2017/023117 A1 | | 2/2017 |
| WO | WO 2017/159253 A1 | | 9/2017 |
| WO | WO 2017/221783 A1 | | 12/2017 |
| WO | WO 2018/037488 A1 | | 3/2018 |

OTHER PUBLICATIONS

Third Party Observation dated May 15, 2020 for Japanese Application 2018-51990.
Written Opinion of the International Searching Authority dated Mar. 19, 2019 for Application No. PCT/JP2019/001600 with an English translation.
Egami, M., "Nano Composite Thin Films Using Functional Nanoparticles, and its Applications," The Micromeritics (2013), No. 56, pp. 42-47.
Office Action issued Oct. 20, 2020, in Japanese Patent Application No. 2020-51990.
Japanese Office Action for Japanese Application No. 2020-001226, dated Feb. 22, 2022, with English translation.
Korean Office Action for Korean Application No. 10-2020-7028177, dated Apr. 22, 2022, with an English translation.

* cited by examiner

ANTI-REFLECTION FILM

TECHNICAL FIELD

The present invention relates to an anti-reflection film. The present application claims priority to Japanese Patent Application No. 2018-051990, filed on Mar. 20, 2018, the entire content of which is incorporated herein by reference.

BACKGROUND ART

An anti-reflection film having both a function of ensuring surface hardness and a function of reducing external light reflection may be provided on a surface of a display in tablet devices and various television sets. The anti-reflection film has a laminated structure of, for example, a transparent substrate, a hard coat layer provided on a substrate, and an anti-reflection layer provided on the hard coat layer. Such an anti-reflection film is disclosed, for example, in Patent Documents 1 to 3 listed below.

CITATION LIST

Patent Document

Patent Document 1: JP 2009-75417 A
Patent Document 2: JP 2010-92003 A
Patent Document 3: JP 2010-191144 A Depending on the application, the anti-reflection film is required to have at least a certain level of bending resistance, that is, a property that does not cause cracks even when the film is bent and deformed. The anti-reflection film provided on the surface of flexible display is particularly required to have excellent bending resistance.

SUMMARY OF INVENTION

Technical Problem

The present invention has been conceived under such circumstances, and an object of the present invention is to provide an anti-reflection film suitable for achieving high bending resistance together with high anti-reflective properties.

Solution to Problem

An anti-reflection film provided by an embodiment of the present invention includes a laminated structure including a substrate, an anti-reflection layer, and a hard coat layer positioned therebetween. The hard coat layer includes at least a curable resin for ensuring hardness thereof, and is formed on a substrate by, for example, a wet coating method. The anti-reflection layer includes at least a curable resin for ensuring hardness and low-refractive-index particles for reducing refractive index, and is formed on the hard coat layer by, for example, the wet coating method. In the present invention, the low-refractive-index particles refer to particles exhibiting a refractive index of 1.10 to 1.45. The refractive index can be measured in accordance with JIS K 7142. The luminous reflectance of the anti-reflection layer side of the anti-reflection film having such a laminated structure is 2% or less, preferably 1.7% or less, more preferably 1.5% or less, and more preferably 1.3% or less. In the present invention, the luminous reflectance refers to a value measured in accordance with JIS Z 8701. In addition, a minimum value of a mandrel diameter indicating the bending resistance is in a range of 6 mm or less, and is preferably in a range of 5 mm or less, more preferably 4 mm or less, and more preferably 3 mm or less in a bending test (first bending test) according to a cylindrical mandrel method in which the test piece of the anti-reflection film is bent with the anti-reflection layer side inward. Additionally or alternatively, the minimum value of the mandrel diameter indicating the bending resistance is in a range of 10 mm or less, and is preferably in the range of 8 mm or less in a bending test (second bending test) according to the cylindrical mandrel method in which the test piece of the anti-reflection film is bent with the anti-reflection layer side outward. The bending resistance refers to a property that does not cause cracks in a bent portion. The bending test according to the cylindrical mandrel method is performed in accordance with JIS K5600-5-1. In this bending test, the film to be tested is subjected to 180° bending deformation around the mandrel along the circumferential surface of the mandrel, which is a core rod having a predetermined diameter. Specifically, in the first bending test, the anti-reflection film is bent in a manner that the hard coat layer and the anti-reflection layer are positioned inside the substrate. Specifically, in the second bending test, the anti-reflection film is bent in a manner that the hard coat layer and the anti-reflection layer are positioned outside the substrate.

The anti-reflection film of the embodiment of the present invention includes the laminated structure including the substrate, the hard coat layer, and the anti-reflection layer with reduced refractive index by blending the low-refractive-index particles, and the luminous reflectance of the anti-reflection layer side is 2% or less, preferably 1.7% or less, more preferably 1.5% or less, and more preferably 1.3% or less. The constitution in which the luminous reflectance of the anti-reflection film is reduced to such a degree is suitable for achieving high anti-reflective properties as a function of the anti-reflection film.

Furthermore, in the present anti-reflection film, as described above, the minimum value of the mandrel diameter indicating bending resistance is in a range of 6 mm or less, preferably 5 mm or less, more preferably 4 mm or less, and more preferably 3 mm or less in the bending test according to the cylindrical mandrel method in which the anti-reflection film test piece is bent with the anti-reflection layer side inward, and additionally or alternatively, the minimum value of the mandrel diameter indicating bending resistance is in a range of 10 mm or less, and preferably in the range of 8 mm or less in the bending test according to the cylindrical mandrel method in which the anti-reflection film test piece is bent with the anti-reflection layer side outward. The constitution in which the bending resistance shown in the bending test by the cylindrical mandrel method is secured to such a degree is suitable for achieving high bending resistance as a function of the anti-reflection film.

Additionally, in the present anti-reflection film, as described above, the hard coat layer includes a curable resin, and the anti-reflection layer includes a curable resin and low-refractive-index particles. Such a constitution is suitable for forming the hard coat layer and the anti-reflection layer from the resin composition by a wet coating method. Furthermore, a constitution in which the present anti-reflection film includes such a laminated structure of a hard coat layer and an anti-reflection layer is suitable for achieving high bending resistance. For example, in the anti-reflection film having the laminated structure of the hard coat layer formed of a resin composition by a wet coating method and the anti-reflection layer formed by depositing an inorganic material on the hard coat layer by a dry coating method, when the film is bent, since the anti-reflection layer formed of the inorganic material and having poor flexibility is not able to follow the bending deformation of the hard coat layer formed of an organic material and having flexibility (that is, since the elongation rate of the anti-reflection layer due to the tension acting on the bent portion when the film is bent is significantly smaller than the elongation rate of the hard coat layer), cracks are likely to occur in the anti-reflection layer. In contrast, in the anti-reflection film of the present invention, the difference between the anti-reflection layer and the hard coat layer is set to be small for the elongation rate due to the tension acting on the bent portion when the film is bent, which is suitable for suppressing the occurrence of cracks in the anti-reflection layer, and therefore is suitable for achieving high bending resistance. In addition, the constitution described above suitable for forming the hard coat layer and the anti-reflection layer from the resin composition by the wet coating method contributes to the realization of the constitution described above with respect to the bending resistance in a bending test according to the cylindrical mandrel method.

As described above, the anti-reflection film of the present invention is suitable for achieving high bending resistance together with high anti-reflective properties.

In the present anti-reflection film, after a rubbing test performed on the surface of the anti-reflection layer using steel wool #0000 as a rubbing material under conditions of a load of 200 g/cm$^2$, a rubbing stroke length of 10 cm, and reciprocations of 1000 times, a difference of the haze value (%) after the rubbing test from the haze value (%) before the rubbing test is 0.1 or less, and preferably 0, or 0 or less. In the present invention, "haze" refers to a value measured in accordance with JIS K 7136. The more scratches formed on the surface to be tested by the rubbing test performed on the anti-reflection film using steel wool #0000 as a rubbing material, the greater the degree of increase in the haze value after the rubbing test from the haze value before the rubbing test in the anti-reflection film tends to be large. The constitution in which the increase in the haze value (%) of the anti-reflection film after the rubbing test performed on the anti-reflection film under the above conditions is reduced to 0.1 or less, and preferably 0, or 0 or less is suitable for achieving high scratch resistance as a function of the anti-reflection film. This is, for example, as shown in the examples and comparative examples below.

The surface of the present anti-reflection film on the anti-reflection layer side has a pencil hardness of preferably 2H or more, more preferably 3H or more, and more preferably 4H or more. The constitution in which the pencil hardness of the surface on the anti-reflection layer side is secured to such a degree is suitable for realizing high hardness as a function of the anti-reflection film.

In the present anti-reflection film, the minimum value of a curvature radius at the bent portion which indicates the bending resistance is preferably in a range of less than 5 mm, more preferably 4 mm or less, more preferably 3 mm or less, more preferably 2 mm or less, and more preferably 1.5 mm or less in a bending test in which bending is performed 100 times continuously with a constant curvature radius at the bent portion with the anti-reflection layer side of the test piece inward. That is, the 2-fold value of the minimum value of the curvature radius at the same bent portion is preferably less than 10 mm, more preferably 8 mm or less, more preferably 6 mm or less, more preferably 4 mm or less, and more preferably 3 mm or less. In addition, in the present anti-reflection film, the minimum value of a curvature radius at the bent portion which indicates the bending resistance is preferably in a range of less than 8 mm, more preferably 6 mm or less, more preferably 4 mm or less, and more preferably 3 mm or less in a bending test in which bending is performed 100 times continuously with a constant curvature radius at the bent portion with the anti-reflection layer side of the test piece outward. That is, the 2-fold value of the minimum value of the curvature radius at the same bent portion is preferably less than 16 mm, more preferably 12 mm or less, more preferably 8 mm or less, and more preferably 6 mm or less. These constitutions are suitable for achieving high bending resistance as a function of the anti-reflection film.

The haze of the present anti-reflection film is preferably 1% or less, more preferably 0.8% or less, more preferably 0.6% or less, more preferably 0.4% or less, and more preferably 0.2% or less. The haze of the present anti-reflection film after the above rubbing test is preferably 1% or less, more preferably 0.8% or less, more preferably 0.6% or less, more preferably 0.4% or less, and more preferably 0.2% or less. In the present anti-reflection film, the constitution in which the haze is reduced to these degrees is preferred to ensure good transparency.

The hard coat layer of the present anti-reflection film preferably includes polyorganosilsesquioxane as the curable resin component. Such a constitution is suitable for achieving high hardness as a function of the anti-reflection film.

The anti-reflection layer preferably contains hollow silica particles as the low-refractive-index particles. The average particle size of the hollow silica particles is preferably from 50 to 70 nm. These constitutions are preferable for the anti-reflection layer or the anti-reflection film to achieve good anti-reflective properties. "Average particle size of the low-refractive-index particles" refers to the average particle size of the fine particles obtained from the fine particle size distribution measured by dynamic light scattering method.

The anti-reflection layer preferably contains nanodiamond particles. In an embodiment of the present invention, the nanodiamond particles may be primary particles of nanodiamond or secondary particles of nanodiamond. The primary particles of nanodiamond refers to nanodiamond having a particle size of 10 nm or less. The constitution in which the anti-reflection layer contains the nanodiamond particles, i.e., fine particles of diamond, which has extremely high mechanical strength, is suitable for achieving high scratch resistance in the anti-reflection layer or the present anti-reflection film.

The anti-reflection layer preferably contains a fluorine-containing curable compound. Such a constitution is preferred from perspectives such as anti-smudge properties, water repellency, oil repellency, slipperiness, and ease of wiping a fingerprint on the exposed surface of the anti-reflection layer. In addition, the constitution in which the anti-reflection layer contains a fluorine-containing curable compound is suitable for reducing the coefficient of kinetic friction and the coefficient of static friction on the surface of the anti-reflection layer and thus is suitable for achieving high scratch resistance in the anti-reflection layer or the present anti-reflection film.

DESCRIPTION OF EMBODIMENTS

Figure 1:
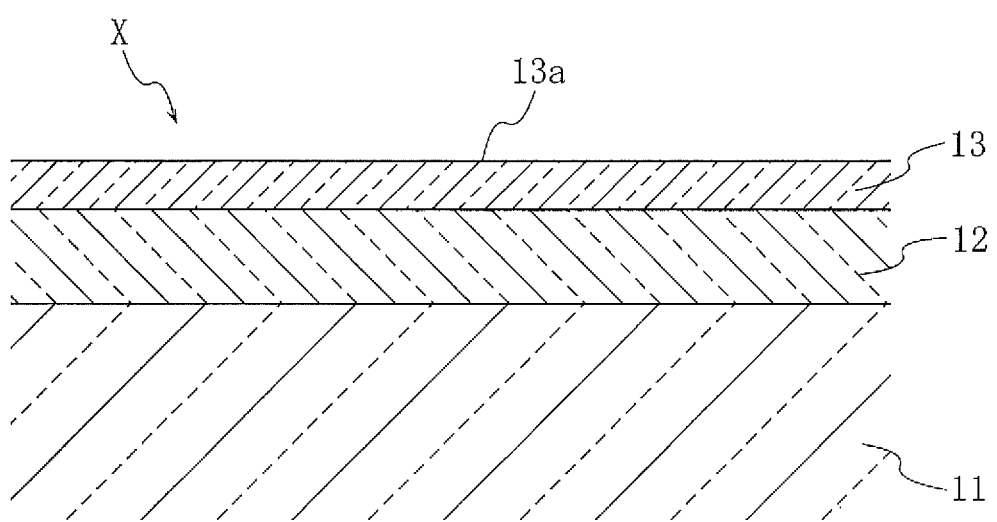
FIG. 1 is a partial cross-sectional view of an anti-reflection film according to an embodiment of the present invention.

FIG. 1 is a partial cross-sectional view of an anti-reflection film X according to an embodiment of the present invention. The anti-reflection film X includes a laminated structure including a substrate 11, a hard coat layer 12, and an anti-reflection layer 13. The anti-reflection film X may include an additional layer in the laminated structure thereof. Such an anti-reflection film X is, for example, provided for use on a surface of an optical member to secure the hardness of the surface and reduce external light reflection. Examples of the optical member include a transparent substrate for a flat panel display, such as a liquid crystal display, an organic electroluminescence display, and a plasma display; and a transparent panel for a touch panel.

The substrate 11 is a transparent substrate, for example, made of a transparent resin film through which light can penetrate. Examples of transparent resin films for the substrate 11 include a cellulose acetate film, a polyester film, a polycarbonate film, a polynorbornene film, a polyimide film, a polyamide film, a polyamide-imide film, a polyetherimide film, a polyarylate film, a polyetherketone film, and a polyetheretherketone film. Examples of the cellulose acetate film include a triacetyl cellulose film, a diacetyl cellulose film, a cellulose acetate propionate film, and a cellulose acetate butyrate film. Examples of the polyester film include a polyethylene terephthalate film and a polyethylene naphthalate (PEN) film. The substrate 11 may be constituted of a single resin film or may include a laminated structure of a plurality of resin films. From the perspective of achieving sufficient transparency in the anti-reflection film X, the thickness of the substrate 11 is preferably 400 μm or less, more preferably 200 μm or less, and more preferably 100 μm or less.

The hard coat layer 12 is positioned between the substrate 11 and the anti-reflection layer 13. The hard coat layer 12 includes a curable resin. Examples of the curable resin include a curable polyorganosilsesquioxane resin and a curable acrylic resin. Examples of the curable polyorganosilsesquioxane resin include epoxy group-containing polysilsesquioxane. From the perspective of increasing the hardness of the hard coat layer 12 or the anti-reflection film X, epoxy group-containing polysilsesquioxane is preferable as the curable resin for forming the hard coat layer 12.

When the epoxy group-containing polysilsesquioxane is included as a curable resin in the hard coat layer 12 or the composition for forming the same, the epoxy group-containing polysilsesquioxane in the present embodiment includes, as a siloxane constituent unit, a first constituent unit [RSiO$_{3/2}$] including at least a constituent unit represented by the following Formula (1) and a second constituent unit [RSiO$_{2/2}$(OR')] including at least a constituent unit represented by the following Formula (2) (R and R' in the second constituent unit may be the same or different). These constituent units belong to so-called T units in the siloxane constituent units, and in the present embodiment, the constituent unit [RSiO$_{3/2}$] is a T3 form, and the constituent unit [RSiO$_{2/2}$(OR')] is a T2 form. In the T3 form, the silicon atom is bonded to three oxygen atoms, each of which is also bonded to a silicon atom in another siloxane constituent unit. In the T2 form, the silicon atom is bonded to two oxygen atoms, each of which is also bonded to a silicon atom in another siloxane constituent unit, and is bonded to an oxygen of an alkoxy group. Each of such T3 form and T2 form is a partial structure of polysilsesquioxane that belongs to the T unit as a siloxane constituent unit as described above and can be formed by hydrolysis of a silane compound having three hydrolyzable functional groups and subsequent condensation reaction.

[Chem. 1]

  (1)

  (2)

$R^1$ in Formula (1) and $R^1$ in Formula (2) each represent a group containing an epoxy group. $R^2$ in the Formula (2) represents a hydrogen atom or an alkyl group having 1 to 4 carbon atoms.

Examples of each $R^1$ in Formulae (1) and (2), that is, epoxy group-containing groups include groups represented by Formulae (3) to (6) below. In Formulae (3) to (6), each of $R^3$, $R^4$, $R^5$, and $R^6$ represents a straight chain or branched chain alkylene group having, for example, 1 to 10 carbon atoms. Examples of the alkylene group include a methylene group, a methyl methylene group, a dimethyl methylene group, an ethylene group, a propylene group, a trimethylene group, a tetramethylene group, a pentamethylene group, a hexamethylene group, and a decamethylene group. From the perspective of achieving high heat resistance and suppressing shrinkage during curing in the hard coat layer 12, each of $R^1$ in Formula (1) and $R^1$ in Formula (2) is preferably an epoxy group-containing group represented by Formula (3) or an epoxy group-containing group represented by Formula (4), and more preferably a 2-(3,4-epoxycyclohexyl) ethyl group, which is a group represented by Formula (3) and having $R^3$ as an ethylene group.

[Chem. 2]

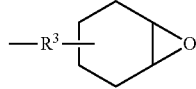  (3)

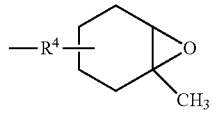  (4)

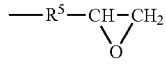  (5)

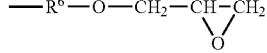  (6)

As described above, $R^2$ in Formula (2) above represents a hydrogen atom or an alkyl group having 1 to 4 carbon atoms, and accordingly, $OR^2$ in Formula (2) represents a hydroxy group or an alkoxy group having 1 to 4 carbon atoms. Examples of the alkoxy group having from 1 to 4 carbon atoms include a methoxy group, an ethoxy group, a propoxy group, an isopropoxy group, a butoxy group, and an isobutyloxy group.

The polysilsesquioxane included in the hard coat layer 12 or the composition for forming the same may include one type or may include two or more types of constituent units represented by Formula (1) above. The polysilsesquioxane may include one type or may include two or more types of constituent units represented by Formula (2) above.

The epoxy group-containing polysilsesquioxane included in the hard coat layer 12 or the composition for forming the hard coat layer 12 may include, as the T3 body, constituent unit represented by Formula (7) below in addition to the constituent unit represented by Formula (1). In Formula (7), $R^7$ represents a hydrogen atom, a substituted or unsubstituted alkyl group, a substituted or unsubstituted alkenyl group, a substituted or unsubstituted cycloalkyl group, a substituted or unsubstituted aryl group, or a substituted or unsubstituted aralkyl group. That is, $R^7$ in Formula (7) is preferably a substituted or unsubstituted alkyl group, a substituted or unsubstituted alkenyl group, or a substituted or unsubstituted aryl group, and more preferably a phenyl group.

$$[R^7SiO_{3/2}] \quad (7)$$

Examples of the alkyl group regarding $R^7$ include a methyl group, an ethyl group, a propyl group, an n-butyl group, an isopropyl group, an isobutyl group, an s-butyl group, a t-butyl group, and an isopentyl group. Examples of the alkenyl group regarding $R^7$ include a vinyl group, an allyl group, and an isopropenyl group. Examples of the cycloalkyl group regarding $R^7$ include a cyclobutyl group, a cyclopentyl group, and a cyclohexyl group. Examples of the aryl group regarding $R^7$ include a phenyl group, a tolyl group, and a naphthyl group. Examples of the aralkyl group regarding $R^7$ include a benzyl group and a phenethyl group.

Examples of the substituents of the alkyl group, alkenyl group, cycloalkyl group, aryl group, and aralkyl group described above regarding $R^7$ include an ether group, an ester group, a carbonyl group, a siloxane group, a halogen atoms such as a fluorine atom, an acryl group, a methacryl group, a mercapto group, an amino group, and a hydroxyl group.

The epoxy group-containing polysilsesquioxane included in the hard coat layer 12 or the composition for forming the hard coat layer 12 may include, as the T2 form, constituent unit represented by Formula (8) below in addition to the constituent unit represented by Formula (2). In Formula (8), $R^7$ represents a hydrogen atom, a substituted or unsubstituted alkyl group, a substituted or unsubstituted alkenyl group, a substituted or unsubstituted cycloalkyl group, a substituted or unsubstituted aryl group, or a substituted or unsubstituted aralkyl group, and specifically the same as $R^7$ in Formula (7) above. In Formula (8), $R^2$ represents a hydrogen atom or an alkyl group having 1 to 4 carbon atoms, and is specifically the same as $R^2$ in Formula (2) above.

[Chem. 4]

$$[R^7SiO_{2/2}(OR^2)] \quad (8)$$

The above epoxy group-containing polysilsesquioxane included in the hard coat layer 12 or the composition for forming the hard coat layer 12 includes, in addition to the first and second constituent units described above, which are T units, in the siloxane constituent units thereof, at least one type selected from the group consisting of a so-called M unit $[RSiO_{1/2}]$, a so-called D unit $[R_2SiO_{2/2}]$, and a so-called Q unit $[SiO_{4/2}]$. From the perspective of achieving high heat resistance and suppressing shrinkage during curing in the hard coat layer 12, the proportion of T units in all siloxane constituent units of the polysilsesquioxane included in the hard coat layer 12 or the composition for forming the hard coat layer 12 is preferably 55 mol % or more, more preferably 60 mol % or more, more preferably 70 mol % or more, and more preferably 80 mol % or more.

As the polysilsesquioxanes, complete cage-type silsesquioxane containing no T2 form as a siloxane constituent unit, imcomplete cage-type silsesquioxane, ladder-type silsesquioxane, and random-type silsesquioxane are known. The epoxy group-containing polysilsesquioxane included in the composition for forming the hard coat layer 12 is preferably at least one type selected from the group consisting of complete cage-type silsesquioxane and incomplete cage-type silsesquioxane. The incomplete cage-type silsesquioxane is preferable as the epoxy group-containing polysilsesquioxane contained in the composition for forming the hard coat layer 12 because the incomplete-type silsesquioxane has excellent balance among the linear thermal expansion coefficient, hardness, and shrinkage during curing in the cured product thereof A significant amount of incomplete cage-type silsesquioxane is preferably included in the composition for forming the hard coat layer 12, and in all siloxane constituent units of the epoxy group-containing polysilsesquioxane in the composition, the value of the molar ratio of T3 form to T2 form (that is, T3 form/T2 form) is preferably 3 or more, more preferably 5 or more, more preferably 6 or more, and more preferably 7 or more (the value of the molar ratio of the ladder-type silsesquioxane itself is approximately from 0.5 to 3). The value of the molar ratio is, for example, 20 or less, preferably 18 or less, and more preferably 16 or less.

The value of molar ratio (T3 form/T2 form) in the epoxy group-containing polysilsesquioxane can be determined, for example, by $^{29}$Si-NMR spectroscopy measurements. In the $^{29}$Si-NMR spectrum, the silicon atoms in the first constituent unit (T3 form) described above and the silicon atoms in the second constituent unit (T2 form) described above indicate peaks or signals for different chemical shifts. The value of the molar ratio can be determined from the area ratio of these peaks. The $^{29}$Si-NMR spectrum of the epoxy group-containing polysilsesquioxane according to an embodiment of the present invention can be measured, for example, with the following instrument and conditions.

Measuring instrument: "JNM-ECA500NMR" (trade name, available from JEOL Ltd.)
Solvent: Deuteriochloroform
Number of scans: 1800 scans
Measurement temperature: 25° C.

From the perspective of achieving high heat resistance in the hard coat layer 12 to be formed, the number-average molecular weight (Mn) of the epoxy group-containing polysilsesquioxane included in the composition for forming the hard coat layer 12 is preferably 500 or more, more preferably 700 or more, more preferably 800 or more, more preferably 900 or more, and more preferably 1000 or more. From the perspective of compatibility with other components in the composition for forming the hard coat layer 12, the number-average molecular weight is preferably 10000 or less, more preferably 5000 or less, more preferably 3000 or less, more preferably 2800 or less, more preferably 2600 or less, and more preferably 2000 or less.

The molecular weight dispersity (Mw/Mn) of the epoxy group-containing polysilsesquioxane included in the composition for forming the hard coat layer 12 is preferably 1 or more, more preferably 1.1 or more, more preferably 1.2 or more, and more preferably 1.45 or more, from the perspective of coating properties of the composition. From the perspective of achieving high heat resistance and suppressing shrinkage during curing in the hard coat layer 12 to be formed, the molecular weight dispersity is preferably 3 or less, more preferably 2 or less, more preferably 1.9 or less, and more preferably 1.8 or less.

The number-average molecular weight (Mn) and the weight average molecular weight (Mw) of the epoxy group-containing polysilsesquioxane are determined by gel permeation chromatography (GPC) and calculated with polystyrene calibration. The number-average molecular weight (Mn) and the weight average molecular weight (Mw) of the polysilsesquioxane can be measured by the following conditions using, for example, an HPLC instrument (trade name "LC-20AD", available from Shimadzu Corporation).

Column: Two Shodex KF—801 (upstream side, available from Showa Denko K.K.), Shodex KF—802 (available from Showa Denko K.K.) and Shodex KF—803 (downstream side, available from Showa Denko K.K.) are connected in series.
Measurement temperature: 40° C.
Eluent: tetrahydrofuran (THF)
Sample concentration: from 0.1 to 0.2 mass %
Flow rate: 1 mL/min
Standard Sample: Polystyrene
Detector: UV-VIS detector (trade name "SPD-20A", available from Shimadzu Corporation)

The epoxy equivalent weight of the epoxy group-containing polysilsesquioxane included in the composition for forming the hard coat layer 12 is preferably 200 g/eq or more and more preferably 205 g/eq or more, from the perspective of suppressing the shrinkage during curing and the coating properties of the composition. From the perspective of achieving high heat resistance in the hard coat layer 12 to be formed, the epoxy equivalent weight is preferably 2000 g/eq or less, more preferably 1500 g/eq or less, more preferably 1200 g/eq or less, and more preferably 1000 g/eq or less.

The epoxy group-containing polysilsesquioxane as described above can be produced by hydrolysis of a silane compound having three hydrolyzable functional groups and subsequent condensation reaction. The raw material used in the production thereof includes at least a compound represented by Formula (9) below, and a compound represented by Formula (10) below is optionally included as necessary. The compound represented by Formula (9) is for forming a constituent unit represented by the above Formula (1) and a constituent unit represented by above Formula (2). The compound represented by Formula (10) is for forming a constituent unit represented by the above Formula (7) and a constituent unit represented by above Formula (8).

[Chem. 5]

$$R^1SiX^1_3 \quad (9)$$

$$R^7SiX^2_3 \quad (10)$$

In Formula (9), $R^1$ represents a group containing an epoxy group, and specifically is the same as $R^1$ in the above Formulae (1) and (2). $X^1$ in Formula (9) above represents an alkoxy group or a halogen atom. Examples of the alkoxy group include alkoxy groups having from 1 to 4 carbons, such as a methoxy group, an ethoxy group, a propoxy group, an isopropyloxy group, a butoxy group, and an isobutyloxy group. In addition, examples of the halogen atom as $X^1$ include a fluorine atom, a chlorine atom, a bromine atom, and an iodine atom. $X^1$ is preferably an alkoxy group, and more preferably a methoxy group and an ethoxy group. In Formula (9), the three $X^1$ may be the same as or different from each other.

In Formula (10), $R^7$ represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group, and specifically the same as $R^7$ in Formulae (7) and (8) above. $X^2$ in Formula (10) represents an alkoxy group or a halogen atom, and is specifically the same as $X^1$ in the above Formula (9).

The raw materials used in the production of the epoxy group-containing polysilsesquioxane described above may also include other hydrolyzable silane compounds. Examples of such a compound include a hydrolyzable trifunctional silane compound other than the compounds represented by Formulae (9) and (10) above, a hydrolyzable monofunctional silane compound forming an M unit, a hydrolyzable bifunctional silane compound forming a D unit, and a hydrolyzable tetrafunctional silane compound forming a Q unit.

The usage amount and the composition of the above hydrolyzable silane compound as the raw material can be appropriately adjusted according to a desired structure of the epoxy group-containing polysilsesquioxane which is a target to be produced. For example, the usage amount of the compound represented by above Formula (9) is not particularly limited and is, for example, from 55 to 100 mol % and preferably from 65 to 100 mol %, relative to a total amount of the hydrolyzable silane compound to be used. The usage amount of the compound represented by above Formula (10) is not particularly limited and is, for example, from 0 to 45 mol % and preferably from 0 to 35 mol %, relative to a total amount of the hydrolyzable silane compound to be used. The total usage amount of the compound represented by Formula (9) and the compound represented by Formula (10) is, for example, from 60 to 100 mol %, preferably from 70 to 100 mol %, and more preferably from 80 to 100 mol % relative to a total amount of the hydrolyzable silane compound to be used.

In a case where two or more types of hydrolysable silane compounds are used in the production of the epoxy group-containing polysilsesquioxane described above, the hydrolysis and condensation reactions for each type of hydrolyzable silane compound can be performed simultaneously or in sequence.

The hydrolysis and condensation reactions described above are preferably carried out in the presence of one or more types of solvents. Examples of preferred solvents include ethers such as diethyl ether, dimethoxyethane, tetrahydrofuran, and dioxane, and ketones such as acetone, methyl ethyl ketone, and methyl isobutyl ketone. The usage amount of the solvent is adjusted as appropriate in accordance with the reaction time and the like within a range of, for example, 2000 parts by mass or less per 100 parts by mass of the hydrolyzable silane compound.

The hydrolysis and condensation reactions described above preferably proceed in the presence of one or more types of catalysts and water. The catalyst may be an acid catalyst or may be an alkali catalyst. The usage amount of the catalyst is not particularly limited and can be appropriately adjusted in a range of, for example, 0.002 to 0.2 mol relative to 1 mol of the hydrolyzable silane compound. The usage amount of the water is not particularly limited and can be appropriately adjusted in a range of, for example, 0.5 to 20 mol relative to 1 mol of the hydrolyzable silane compound.

In a case where the epoxy group-containing polysilsesquioxane in which the value of molar ratio (T3 form/T2 form) is 5 or more is produced, the reaction temperature of the hydrolysis and condensation reactions described above is, for example, from 40° C. to 100° C. and preferably from 45° C. to 80° C. In addition, the reaction time of the hydrolysis and condensation reactions is, for example, from 0.1 to 10 hours, and preferably from 1.5 to 8 hours. Furthermore, the hydrolysis and condensation reactions can be performed under normal pressure, under increased pressure, or under reduced pressure. The hydrolysis and condensation reactions described above is preferably performed under an atmosphere of an inert gas such as nitrogen or argon.

By the hydrolysis and condensation reactions of the hydrolyzable silane compound as described above, the above-described epoxy group-containing polysilsesquioxane is obtained. After the completion of the reaction, the catalyst is preferably neutralized to suppress the ring-opening of the epoxy group. The epoxy group-containing polysilsesquioxane obtained as described above is purified as necessary.

The composition for forming the hard coat layer 12 preferably includes at least one type of curing catalyst in addition to the epoxy group-containing polysilsesquioxane produced as described above. Furthermore, the content of the epoxy group-containing polysilsesquioxane in the composition for forming the hard coat layer 12 is, for example, 70 mass % or more, preferably from 80 to 99.8 mass %, and more preferably from 90 to 99.5 mass %, relative to the total amount of the curable composition excluding the solvent, from the perspective of the hardness of the hard coat layer 12 to be formed.

Examples of the curing catalyst in the case where the composition for forming the hard coat layer 12 includes a curing catalyst include a photocationic polymerization initiator and a thermal cationic polymerization initiator. The content of the curing catalyst in the composition for forming the hard coat layer 12 is preferably from 0.1 to 3.0 parts by mass, and more preferably from 0.3 to 1 parts by mass per 100 parts by mass of the epoxy group-containing polysilsesquioxane.

Examples of the photocationic polymerization initiator include various types of photocationic polymerization initiators such as a sulfonium salt (a salt of a sulfonium ion and an anion), an iodonium salt (a salt of an iodonium ion and an anion), a selenium salt (a salt of a selenium ion and an anion), a phosphonium salt (a salt of a phosphonium ion and an anion).

Examples of the sulfonium salt used as the photocationic polymerization initiator include a monoarylsulfonium salt, a diarylsulfonium salt, triarylsulfonium salt, and a trialkylsulfonium salt. Examples of the monoarylsulfonium salt include a phenylmethylbenzylsulfonium salt, a 4-hydroxyphenylmethylbenzylsulfonium salt, and a 4-methoxyphenylmethylbenzylsulfonium salt. Examples of the diarylsulfonium salt include a diphenylphenacylsulfonium salt, a diphenyl 4-nitrophenacylsulfonium salt, a diphenylbenzylsulfonium salt, and a diphenylmethylsulfonium salt. Examples of the triarylsulfonium salt incldue a triphenylsulfonium salt, a tri-p-tolylsulfonium salt, a tri-o-tolylsulfonium salt, a tris (4-methoxyphenyl) sulfonium salt, a 1-naphthyldiphenylsulfonium salt, a 2-naphthyldiphenylsulfonium salt, a tris (4-fluorophenyl) sulfonium salt, a tri-1-naphthylsulfonium salt, a tri-2-naphthylsulfonium salt, a tris (4-hydroxyphenyl) sulfonium salt, a 4-(p-tolylthio) phenyl di-(p-phenyl) sulfonium salt, trade name "HS-1PC" (available from San-Apro Ltd.), trade name "LW-S1" available from San-Apro Ltd.), and a diphenyl [4-(phenylthio) phenyl] sulfonium salt. Examples of the diphenyl [4-(phenylthio) phenyl] sulfonium salt include trade name "CPI-100 P" (available from San-Apro Ltd.), trade name "CPI-101A" (available from San-Apro Ltd.), and trade name "CPI-210S" (available from San-Apro Ltd.). Further, Examples of trialkylsulfonium salt include a dimethylphenacylsulfonium salt, a phenacyltetrahydrothiophenium salt, and a dimethylbenzylsulfonium salt.

Examples of the iodonium salt described as the photocationic polymerization initiator include a bis(4-dodecylphenyl) iodonium salt, a diphenyliodonium salt, a bis(4-dodecylphenyl) iodonium salt, and a bis(4-methoxyphenyl) iodonium salt.

Examples of the selenium salt as the photocationic polymerization initiator include a triphenylselenium salt, a tri-p-tolylselenium salt, a tri-o-tolylselenium salt, a tris(4-methoxyphenyl)selenium salt, a 1-naphthyldiphenylselenium salt, a diphenylphenacylselenium salt, a diphenylbenzylselenium salt, a diphenylmethylselenium salt, and a phenylmethylbenzylselenium salt.

Examples of the phosphonium salt as the photocationic polymerization initiator include a tetraphenylphosphonium salt, a tetra-p-tolylphosphonium salt, a tetrakis(2-methoxyphenyl)phosphonium salt, a triphenylbenzylphosphonium salt, a triethylbenzylphosphonium salt, a tributylbenzylphosphonium salt, a tetraethylphosphonium salt, a tetrabutylphosphonium salt, and a triethylphenacylphosphonium salt.

Examples of the anion (counter ion) for forming the various salts include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, $(CF_3SO_2)_3C^-$, $(CF_3SO_2)_2N^-$, a perhalate ion, a halogenated sulfonate ion, a sulfate ion, a carbonate ion, an aluminate ion, a hexafluorobismuthate ion, a carboxylate ion, a aryl borate ion, a thiocyanate ion, a nitrate ion, and a sulfonate anion. Examples of the sulfonate anion include a trifluoromethanesulfonate anion, a pentafluoroethanesulfonate anion, a nonafluorobutanesulfonate anion, a methanesulfonate anion, a benzenesulfonate anion, and a p-toluenesulfonate anion.

Examples of thermal cationic polymerization initiator described above include verious types of thermal cationic polymerization initiators such as an arylsulfonium salt, an aluminum chelate, and a boron trifluoride amine complex. Examples of the arylsulfonium salt include hexafluoroantimonate salts. Examples of the aluminum chelate include ethylacetoacetate aluminum diisopropylate and aluminum tris(ethylacetoacetate). Examples of the boron trifluoride amine complex include a boron trifluoride monoethyl amine complex, a boron trifluoride imidazole complex, and a boron trifluoride piperidine complex.

From the perspective of the hardness of the hard coat layer 12 to be formed, the curing catalyst included in the composition for forming the hard coat layer 12 is preferably a photocationic polymerization initiator, more preferably a sulfonium salt, more preferably a triarylsulfonium salt, and more preferably a diphenyl [4-(phenylthio) phenyl] sulfonium salt.

In addition to the epoxy group-containing polysilsesquioxane described above, the composition for forming the hard coat layer 12 may include one type or more types of other curable compounds or cationically curable compounds. Examples of the curable compound include an epoxy compound other than the epoxy group-containing polysilsesquioxane described above, an oxetane compound, and a vinyl ether compound.

Examples of the epoxy compound other than the epoxy group-containing polysilsesquioxane described above include an alicyclic epoxy compound (alicyclic epoxy resin), an aromatic epoxy compound (aromatic epoxy resin), and an aliphatic epoxy compound (aliphatic epoxy resin). Examples of the alicyclic epoxy compound include 3,4,3', 4′-diepoxybicyclohexane, 2,2-bis(3,4-epoxycyclohexyl) propane, 1,2-bis(3,4-epoxycyclohexyl) ethane, 2,3-bis(3,4-epoxycyclohexyl) oxirane, bis(3,4-epoxycyclohexylmethyl) ether, and an 1,2-epoxy-4-(2-oxiranyl) cyclohexane adduct of 2,2-bis(hydroxymethyl)-1-butanol (for example, "EHPE3150" (trade name, available from Daicel Corporation.)).

Examples of the aromatic epoxy compound include an epibis type glycidyl ether epoxy resin and a novolac alkyl type glycidyl ether epoxy resin.

Examples of the aliphatic epoxy compound include glycidyl ethers of a q-valent alcohol (q is a natural number) having no cyclic structure, glycidyl esters of monocarboxylic acid or polycarboxylic acid, and an epoxy compound of fat and oil having a double bond. Examples of the epoxy compound of the fat and oil having a double bond include epoxidized linseed oil, epoxidized soybean oil, and epoxidized castor oil.

Examples of the oxetane compound include 3,3-bis(vinyloxymethyl) oxetane, 3-ethyl-3-(hydroxymethyl) oxetane, 3-ethyl-3-(2-ethylhexyloxymethyl) oxetane, 3-ethyl-3-(hydroxymethyl) oxetane, 3-ethyl-3-[(phenoxy)methyl] oxetane, 3-ethyl-3-(hexyloxymethyl) oxetane, 3-ethyl-3-(chloromethyl) oxetane, and 3,3-bis(chloromethyl) oxetane.

Examples of the vinyl ether compound include 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, diethylene glycol monovinyl ether, diethylene glycol divinyl ether, triethylene glycol monovinyl ether, and triethylene glycol divinyl ether.

From the perspective of ensuring strength and smoothness of the hard coat layer 12 to be formed, the composition for forming the hard coat layer 12 preferably contains a fluorine-containing curable compound. Examples of such a fluorine-containing curable compound include a fluorinated alkyl (meth)acrylate, a fluorinated (poly)oxyalkylene glycol di(meth)acrylate, a fluorine-containing epoxy resin, and a fluorine-containing urethane resin. Examples of the fluorinated alkyl (meth)acrylate include perfluorooctylethyl (meth)acrylate and trifluoroethyl (meth)acrylate. Examples of the fluorinated (poly)oxyalkylene glycol di(meth)acrylate include fluoroethylene glycol di(meth)acrylate and fluoropropylene glycol di(meth)acrylate. Examples of commercially available products of such a fluorine-containing curable compound include "Polyfox 3320" from Omnova Solution, "KY-1203" from Shin-Etsu Chemical Co., Ltd., "Megaface RS-90" from DIC Corporation, and "Optool DSX" from Daikin Industries, Ltd.

the composition for forming the hard coat layer 12 preferably contains a solvent to adjust the coating properties and the like thereof. Examples of the solvent include methyl ethyl ketone, methyl isobutyl ketone, cyclohexanone, toluene, xylene, ethyl acetate, butyl acetate, 3-methoxybutyl acetate, methoxypropyl acetate, ethylene glycol monomethyl ether acetate, methanol, ethanol, isopropyl alcohol, 1-butanol, 1-methoxy-2-propanol, 3-methoxybutanol, ethoxyethanol, diisopropyl ether, ethylene glycol dimethyl ether, and tetrahydrofuran.

The hard coat layer 12 or the composition for forming the hard coat layer 12 may further contain an additive of various types, such as an anti-foaming agent, a photosensitizer, an ultraviolet absorber, an antioxidant, a photostabilizer, an anti-blocking agent, a leveling agent, a surfactant, an extender, a pigment, a dye, an antirust agent, an antistatic agent, and a plasticizer.

From the perspective of the balance between the transparency in the anti-reflection film X and the hardness of the hard coat layer 12, the thickness of the hard coat layer 12 is preferably from 1 to 30 μm and more preferably from 3 to 10 μm.

In the present embodiment, the anti-reflection layer 13 in the anti-reflection film X contains a curable resin, low-refractive-index particles, and nanodiamond particles, and includes a surface 13a on the opposite side of the hard coat layer 12. In addition, the net refractive index of the anti-reflection layer 13 is lower than the net refractive index of the hard coat layer 12 and is, for example, from 1.3 to 1.4. The refractive index can be measured in accordance with JIS K 7142.

In the present embodiment, the curable resin in the anti-reflection layer 13 is a polymer of a (meth)acryloyl group-containing compound. The component for forming such a curable resin preferably contains a monomer and/or an oligomer for forming a curable acrylic resin by allowing a polymerization reaction to proceed by light irradiation or heating. A polyfunctional (meth)acrylate can be used as such a monomer or a monomer for forming the oligomer. Examples of the polyfunctional (meth)acrylate include a bifunctional (meth)acrylate, a trifunctional (meth)acrylate, and a tetrafunctional or higher polyfunctional (meth)acrylate. Examples of the bifunctional (meth)acrylate include ethylene glycol di(meth)acrylate, diethylene glycol di(meth)acrylate, polyethylene glycol di(meth)acrylate, butanediol di(meth)acrylate, neopentyl glycol di(meth)acrylate, hexanediol di(meth)acrylate, and nonanediol di(meth)acrylate. Examples of the trifunctional (meth)acrylate include trimethylolethane tri(meth)acrylate, trimethylolpropane tri(meth)acrylate, glycerin tri(meth)acrylate, pentaerythritol tri(meth)acrylate, ditrimethylolpropane tri(meth)acrylate, and dipentaerythritol tri(meth)acrylate. Examples of the tetrafunctional or higher polyfunctional (meth)acrylate include pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate. One type of polyfunctional (meth)acrylate, or two or more types of polyfunctional (meth)acrylates may be used as the monomer in the curable resin-forming component or the monomer for forming the oligomer in the curable resin-forming component. The ratio of the polyfunctional (meth)acrylate in the curable resin-forming component is preferably 50 mass % or more and more preferably 75 mass % or more.

The curable resin-forming component may contain a monofunctional (meth)acrylate including one (meth)acryloyl group. Examples of such a monofunctional (meth) acrylate include β-carboxyethyl (meth)acrylate, isobornyl (meth)acrylate, octyl (meth)acrylate, decyl (meth)acrylate, EO-modified phenol (meth)acrylate, EO-modified nonylphenol (meth)acrylate, and EO-modified 2-ethylhexyl (meth)acrylate. The curable resin-forming component may contain one type of monofunctional (meth)acrylate or may contain two or more types of monofunctional (meth)acrylates. In addition, the curable resin-forming component may contain, as an acrylic oligomer, epoxy (meth)acrylate, polyester (meth)acrylate, urethane (meth)acrylate, or the like.

The curable resin-forming component preferably contains a fluorine-containing curable compound from the perspective of ensuring strength and surface slipperiness of the anti-reflection layer 13. The high strength and surface slipperiness of the anti-reflection layer 13 contribute to achieving high scratch resistance in the anti-reflection layer 13 or the anti-reflection film X. Examples of the fluorine-containing curable compound for the anti-reflection layer 13 include a fluorinated alkyl (meth)acrylate, a fluorinated (poly)oxyalkylene glycol di(meth)acrylate, a fluorine-containing epoxy resin, and a fluorine-containing urethane resin. Examples of the fluorinated alkyl (meth)acrylate include perfluorooctylethyl (meth)acrylate and trifluoroethyl (meth)acrylate. Examples of the fluorinated (poly)oxyalkylene glycol di(meth)acrylate include fluoroethylene glycol di(meth)acrylate and fluoropropylene glycol di(meth)acrylate. Examples of commercially available products of such a fluorine-containing curable compound include "Polyfox 3320" from Omnova Solution, "KY-1203" from Shin-Etsu Chemical Co., Ltd., "Megaface RS-90" from DIC Corporation, and "Optool DSX" from Daikin Industries, Ltd.

The curable resin-forming component preferably contains a polymerization initiator. Examples of the polymerization initiator include a photopolymerization initiator of various types and a thermal polymerization initiator of various types described above as the polymerization initiator in the composition for forming the hard coat layer 12.

The low-refractive-index particles in the anti-reflection layer 13 are particles exhibiting a refractive index of 1.10 to 1.45 in the present embodiment. The refractive index can be measured in accordance with JIS K 7142. Examples of the constituent material of the low-refractive-index particles include $MgF_2$, LiF, AlF, $3NaF \cdot AlF$, and $Na_3AlF_6$. In addition, particles including a void inside the particle, such as hollow particles, may be used as the low-refractive-index particles. The particles including a void inside the particle have low net refractive index due to the combination of the refractive index of the constituent material portion and the refractive index of air (about 1) in the void portion. From the perspective of efficiently reducing the refractive index while ensuring hardness in the anti-reflection layer 13, the low-refractive-index particles are preferably hollow silica particles. Examples of commercially available products of the low-refractive-index particles include "Thrulya 4320" and "Thrulya 5320" available from JGC Catalysts & Chemicals Ltd., and "SiliNax" available from Nittetsu Mining Co., Ltd.

The average particle size of the low-refractive-index particles in the anti-reflection layer 13 is preferably from 50 to 70 nm from the perspective of achieving good antireflective properties in the anti-reflection layer 13 or the anti-reflection film X. "Average particle size of the low-refractive-index particles" refers to the average particle size of the fine particles obtained from the fine particle size distribution measured by dynamic light scattering method.

The content ratio of the low-refractive-index particles in the anti-reflection layer 13 is, for example, from 10 to 90 mass % and preferably from 30 to 70 mass %.

The nanodiamond particles in the anti-reflection layer 13 may be primary particles of nanodiamond or secondary particles of nanodiamond. The primary particles of nanodiamond refers to nanodiamond having a particle size of 10 nm or less. In addition, the nanodiamond particles are preferably nanodiamond particles formed by detonation method (detonation nanodiamond particles) as described below. By the detonation method, nanodiamond particles having a primary particle size of 10 nm or less can be appropriately synthesized.

From the perspective of dispersion stability, the nanodiamond particles in the anti-reflection layer 13 are preferably surface-modified nanodiamond particles to which surface a silane coupling agent is bonded. The silane coupling agent is an organosilicon compound including both a reactive group containing silicon and an organic chain bonded to the silicon and forming a chemical bond with an inorganic material. The silane coupling agent for the surface-modified nanodiamond particles is bonded to the nanodiamond particle by forming a covalent bond with the surface of the nanodiamond particle with the reactive group. Examples of the reactive group of the silane coupling agent that is to form the silane coupling agent bonded to the nanodiamond particle include a silanol group (—SiOH) and a hydrolyzable group that can form a silanol group. Examples of such a hydrolyzable group include an alkoxysilyl group, such as a methoxy group and an ethoxy group, bonded to the silicon; a halosilyl group, such as chlorine and bromine, bonded to the silicon; and an acetoxy group bonded to the silicon. These hydrolyzable groups can form a silanol group through a hydrolysis reaction. A chemical bond can be formed between the silane coupling agent and the nanodiamond surface through a dehydration condensation reaction between the silanol group of the silane coupling agent and, for example, a hydroxyl group on the nanodiamond surface. The organic chain of the silane coupling agent preferably contains a (meth)acryloyl group or an alkyl group. Such a constitution facilitates the dispersion stability of the surface-modified nanodiamond particles in the anti-reflection layer 13. The (meth)acryloyl group-containing organic chain is preferably propyl acrylate and/or propyl methacrylate. The alkyl group that forms the organic chain of the silane coupling agent is preferably an alkyl group having from 1 to 18 carbons and more preferably a methyl group. Examples of the silane coupling agent in such surface-modified nanodiamond particles include 3-(trimethoxysilyl)propyl acrylate, 3-(trimethoxysilyl)propyl methacrylate, 3-(methyldimethoxysilyl)propyl methacrylate, 3-(methyldiethoxysilyl)propyl methacrylate, 3-(triethoxysilyl)propyl methacrylate, and trimethoxy(methyl)silane.

When the silane coupling agent in the surface-modified nanodiamond particles contains a (meth)acryloyl group in the organic chain of the silane coupling agent, in the polymerization process of the above monomer or oligomer for forming the curable resin, the (meth)acryloyl group in the surface organic chain of the surface-modified nanodiamond particles is allowed to react with the monomer or oligomer, and the nanodiamond particles are thereby readily incorporated into the curable resin. Examples of such a silane coupling agent include 3-(trimethoxysilyl)propyl acrylate, 3-(trimethoxysilyl)propyl methacrylate, 3-(methyldimethoxysilyl)propyl methacrylate, 3-(methyldiethoxysilyl)propyl methacrylate, and 3-(triethoxysilyl)propyl methacrylate.

The particle size D50 of the nanodiamond particles (including the case of the surface-modified nanodiamond particles) is preferably 100 nm or less and more preferably 30 nm or less. Such a constitution is suitable for achieving high transparency of the anti-reflection layer 13 and thus is suitable for achieving high transparency of the anti-reflection film X.

The content ratio of the nanodiamond particles in the anti-reflection layer 13 is, for example, from 0.1 to 15 mass % and preferably from 0.5 to 10 mass %. In addition, the mass ratio of the above low-refractive-index particles and the nanodiamond particles in the anti-reflection layer 13 is preferably in a range of 99:1 to 84:16. Such a constitution is suitable for achieving a balance between anti-reflective properties, scratch resistance, and transparency in the anti-reflection film X.

The composition for forming the anti-reflection layer 13 preferably contains a solvent to adjust the coating properties and the like, in addition to the above curable resin-forming component, the low-refractive-index particles, and the nanodiamond particles. Examples of the solvent include the same solvent as those described above as the solvent in the composition for forming the hard coat layer 12.

The anti-reflection layer 13 or the composition for forming the anti-reflection layer may further contain an additive of various types, such as an anti-foaming agent, a photosensitizer, an ultraviolet absorber, an antioxidant, a photostabilizer, an anti-blocking agent, a leveling agent, a surfactant, an extender, a pigment, a dye, an antirust agent, an antistatic agent, and a plasticizer.

The thickness of the anti-reflection layer 13 is, for example, from 0.07 to 0.13 μm and preferably from 0.08 to 0.12 μm.

The haze of the anti-reflection film X including the laminated structure as described above is preferably 1% or less, more preferably 0.8% or less, more preferably 0.6% or less, more preferably 0.4% or less, and more preferably 0.2% or less. In addition, the total light transmittance of the anti-reflection film X is preferably 93% or more, more preferably 93.9% or more, and more preferably 94% or more. In an embodiment of the present invention, the total light transmittance refers to a value measured in accordance with JIS K 7105.

The luminous reflectance of the anti-reflection film X on the anti-reflection layer 13 side is 2% or less, preferably 1.7% or less, more preferably 1.5% or less, more preferably 1.3% or less, more preferably 1.1% or less, and more preferably 0.9% or less. In the present embodiment, the luminous reflectance refers to a value measured in accordance with JIS Z 8701. The luminous reflectance of the anti-reflection film X on the anti-reflection layer 13 side can be adjusted, for example, by tuning the refractive index difference between the hard coat layer 12 and the anti-reflection layer 13. The refractive index difference can be tuned, for example, by increasing the refractive index of the hard coat layer 12 through composition adjustment and by reducing the refractive index of the anti-reflection layer 13 through composition adjustment.

The surface 13a of the anti-reflection layer 13, that is, the anti-reflection layer 13 side surface of the anti-reflection film X, preferably has a pencil hardness of 2H or more, more preferably 3H or more, more preferably 4H or more, and more preferably 5H or more. The pencil hardness may be measured in accordance with JIS K 5400-5-4.

In the anti-reflection film X, after a rubbing test performed on the surface 13a of the anti-reflection layer 13 using steel wool #0000 as a rubbing material under conditions of a load of 200 g/cm², a rubbing stroke length of 10 cm, and reciprocations of 1000 times, a difference of the haze value (%) after the rubbing test from the haze value (%) before the rubbing test is 0.1 or less, and preferably 0, or 0 or less. The haze of the anti-reflection film X after the rubbing test is preferably 1% or less, more preferably 0.8% or less, more preferably 0.6% or less, more preferably 0.4% or less, and more preferably 0.2% or less. The total light transmittance of the anti-reflection film X after the rubbing test is preferably 93% or more, more preferably 93.9% or more, and more preferably 94% or more.

In addition, a minimum value of a mandrel diameter indicating the bending resistance is in a range of 6 mm or less, and is preferably in a range of 5 mm or less, more preferably 4 mm or less, and more preferably 3 mm or less in a bending test (first bending test) according to a cylindrical mandrel method in which the test piece of the anti-reflection film X is bent with the anti-reflection layer 13 side inward. Additionally or alternatively, the minimum value of the mandrel diameter indicating the bending resistance is in a range of 10 mm or less, and is preferably in the range of 8 mm or less in a bending test (second bending test) according to a cylindrical mandrel method in which the test piece of the anti-reflection film X is bent with the anti-reflection layer 13 side outward. The bending test according to the cylindrical mandrel method is performed in accordance with JIS K5600-5-1. In this bending test, the film to be tested is subjected to 180° bending deformation around the mandrel along the circumferential surface of the mandrel, which is a shaft center having a predetermined diameter. Specifically, in the first bending test, the anti-reflection film X is bent in a manner that the hard coat layer 12 and the anti-reflection layer 13 are positioned inside the substrate 11. Specifically, in the second bending test, the anti-reflection film X is bent in a manner that the hard coat layer 12 and the anti-reflection layer 13 are positioned outside the substrate 11.

In the present anti-reflection film X, the minimum value of a curvature radius at the bent portion that indicates the bending resistance is preferably in a range of less than 5 mm, more preferably 4 mm or less, more preferably 3 mm or less, more preferably 2 mm or less, and more preferably 1.5 mm or less in a continuous bending test in which bending is performed 100 times continuously with a constant curvature radius at the bent portion with the anti-reflection layer 13 side of the test piece inward. That is, the 2-fold value of the minimum value of the curvature radius at the same bent portion is preferably in a range of less than 10 mm, more preferably 8 mm or less, more preferably 6 mm or less, more preferably 4 mm or less, and more preferably 3 mm or less. In addition, in the present anti-reflection film X, the minimum value of a curvature radius at the bent portion that indicates the bending resistance is preferably in a range of less than 8 mm, more preferably 6 mm or less, more preferably 4 mm or less, and more preferably 3 mm or less in a continuous bending test in which bending is performed 100 times continuously with a constant curvature radius at the bent portion with the anti-reflection layer 13 side of the test piece outward. That is, the 2-fold value of the minimum value of the curvature radius at the same bent portion is preferably in a range of less than 16 mm, more preferably 12 mm or less, more preferably 8 mm or less, and more preferably 6 mm or less. The continuous bending test can be performed using, for example, a continuous bending tester (trade name "Tension Free U-shape Folding Test Machine DLDM111LHB", available from Yuasa System Co., Ltd.).

The anti-reflection film X as described above can be produced, for example, by sequentially forming the hard coat layer 12 and the anti-reflection layer 13 on the substrate 11. In forming the hard coat layer 12 on the substrate 11, first, the above composition for forming the hard coat layer 12 containing, for example, epoxy group-containing polysilsesquioxane as a curable resin is applied on the substrate 11 to form a composition layer. Examples of the coating means include a bar coater, a spray coater, a spin coater, a dip coater, a die coater, a comma coater, and a gravure coater. Next, irradiation of radiation such as ultraviolet radiation or the like to the composition layer or heating to a predetermined temperature is performed in accordance with the type of curable resin in the composition, and the composition layer is cured. In this way, the hard coat layer 12 is formed on the substrate 11 by the wet coating method. In forming the anti-reflection layer 13 on the hard coat layer 12, first, the composition for forming the anti-reflection layer-containing at least the above curable resin-forming component, the low-refractive-index particles, and the nanodiamond particles is applied on the hard coat layer 12 to form a composition layer. Examples of the coating means include a bar coater, a spray coater, a spin coater, a dip coater, a die coater, a comma coater, and a gravure coater. The composition layer on the substrate 11 is then dried and cured. The anti-reflection layer 13 is formed by such a wet coating method. The anti-reflection film X can be produced, for example, as described above.

As described above, the anti-reflection film X includes the laminated structure including the substrate 11, the hard coat layer 12, and the anti-reflection layer 13 with reduced refractive index by blending the low-refractive-index particles, and the luminous reflectance of the anti-reflection layer 13 side is 2% or less, preferably 1.7% or less, more preferably 1.5% or less, and more preferably 1.3% or less. The constitution in which the luminous reflectance of the anti-reflection film X is reduced to such a degree is suitable for achieving high anti-reflective properties as a function of the anti-reflection film X.

Furthermore, in the anti-reflection film X, as described above, the minimum value of the mandrel diameter indicating bending resistance is in a range of 6 mm or less, preferably 5 mm or less, more preferably 4 mm or less, and more preferably 3 mm or less in a bending test according to a cylindrical mandrel method in which the test piece of the anti-reflection film X is bent with the anti-reflection layer 13 side inward, and additionally or alternatively, the minimum value of the mandrel diameter indicating bending resistance is in a range of 10 mm or less, and preferably in the range of 8 mm or less in a bending test according to a cylindrical mandrel method in which the test piece of the anti-reflection film X is bent with the anti-reflection layer 13 side outward. The constitution in which the bending resistance shown in the bending test by the cylindrical mandrel method is secured to such a degree is suitable for achieving high bending resistance as a function of the anti-reflection film X.

Additionally, in the anti-reflection film X, as described above, the hard coat layer 12 includes a curable resin, and the anti-reflection layer 13 includes a curable resin and low-refractive-index particles. Such a constitution is suitable for forming the hard coat layer 12 and the anti-reflection layer 13 from the resin composition by a wet coating method. Furthermore, a constitution in which the anti-reflection film X includes such a laminated structure of the hard coat layer 12 and the anti-reflection layer 13 is suitable for achieving high bending resistance. For example, in the anti-reflection film having the laminated structure of the hard coat layer formed of a resin composition by a wet coating method and the anti-reflection layer formed by depositing an inorganic material on the hard coat layer by a dry coating method, when the film is bent, since the anti-reflection layer formed of the inorganic material and having poor flexibility is not able to follow the bending deformation of the hard coat layer formed of an organic material and having flexibility (that is, since the elongation rate of the anti-reflection layer due to the tension acting on the bent portion when the film is bent is significantly smaller than the elongation rate of the hard coat layer), cracks are likely to occur in the anti-reflection layer. In contrast, in the anti-reflection film X described above, the difference between the anti-reflection layer 13 and the hard coat layer 12 is set to be small with respect to the elongation rate due to the tension acting on the bent portions when the film is bent, which is suitable for suppressing the occurrence of cracks in the anti-reflection layer 13, and is therefore suitable for achieving high bending resistance. In addition, the constitution described above suitable for forming the hard coat layer 12 and the anti-reflection layer 13 from the resin composition by the wet coating method contributes to the realization of the constitution described above with respect to the bending resistance in a bending test according to the cylindrical mandrel method.

As described above, the anti-reflection film X is suitable for achieving high bending resistance together with high anti-reflective properties.

In the anti-reflection film X, after a rubbing test performed on the surface 13a of the anti-reflection layer 13 using steel wool #0000 as a rubbing material under conditions of a load of 200 g/cm$^2$, a rubbing stroke length of 10 cm, and reciprocations of 1000 times, a difference of the haze value (%) after the rubbing test from the haze value (%) before the rubbing test is, as described above, 0.1 or less, and preferably 0, or 0 or less. The more scratches formed on the surface to be tested by the rubbing test performed on the anti-reflection film X using steel wool #0000 as a rubbing material, the greater the degree of increase in the haze value after the rubbing test from the haze value before the rubbing test in the anti-reflection film X tends to be large. The constitution in which the increase in the haze value (%) of the anti-reflection film X after the rubbing test performed on the anti-reflection film X under the above conditions is reduced to 0.1 or less, and preferably 0, or 0 or less is suitable for achieving high scratch resistance as a function of the anti-reflection film X.

The surface 13a of the anti-reflection film X on the anti-reflection layer 13 side has a pencil hardness of preferably 2H or more, more preferably 3H or more, and more preferably 4H or more, as described above. The constitution in which the pencil hardness of the anti-reflection layer 13 side surface is secured to such a degree is suitable for realizing high hardness as a function of the anti-reflection film X.

In the anti-reflection film X, the minimum value of the curvature radius at the bent portion that indicates the bending resistance in a bending test, in which bending is performed 100 times continuously with a constant curvature radius at the bent portion with the anti-reflection layer 13 side of the test piece inward, as described above, is preferably in a range of less than 5 mm, more preferably 4 mm or less, more preferably 3 mm or less, more preferably 2 mm or less, and more preferably 1.5 mm or less (that is, the 2-fold value of the minimum value of the curvature radius at the same bent portion is preferably less than 10 mm, more preferably 8 mm or less, more preferably 6 mm or less, more preferably 4 mm or less, and more preferably 3 mm or less). In addition, in the anti-reflection film X, the minimum value of the curvature radius at the bent portion that indicates the bending resistance in a bending test, in which bending is performed 100 times continuously with a constant curvature radius at the bent portion with the anti-reflection layer 13 side of the test piece outward, as described above, is preferably in a range of less than 8 mm, more preferably 6 mm or less, more preferably 4 mm or less, and more preferably 3 mm or less (that is, the 2-fold value of the minimum value of the curvature radius at the same bent portion is preferably less than 16 mm, more preferably 12 mm or less, more preferably 8 mm or less, and more preferably 6 mm or less). These constitutions are suitable for achieving high bending resistance as a function of the anti-reflection film X.

The haze of the anti-reflection film X is preferably 1% or less, more preferably 0.8% or less, more preferably 0.6% or less, more preferably 0.4% or less, and more preferably 0.2% or less, as described above. The haze of the anti-reflection film X after the rubbing test is preferably 1% or less, more preferably 0.8% or less, more preferably 0.6% or less, more preferably 0.4% or less, and more preferably 0.2% or less, as described above. In the anti-reflection film X, the constitution in which the haze is reduced to such a degree is preferred to ensure good transparency.

The total light transmittance of the anti-reflection film X is preferably 93% or more, more preferably 93.9% or more, and more preferably 94% or more, as described above. The total light transmittance of the anti-reflection film X after the rubbing test is preferably 93% or more, more preferably 93.9% or more, and more preferably 94% or more, as described above. In the anti-reflection film X, the constitution in which the total light transmittance is ensured to such a degree is preferred to achieve high transparency.

The anti-reflection layer 13 preferably contains hollow silica particles as the low-refractive-index particles, as described above. The average particle size of the hollow silica particles and the low-refractive-index particles is preferably from 50 to 70 nm as described above. These constitutions are suitable for achieving good anti-reflective properties in the anti-reflection layer 13 or the anti-reflection film X.

The anti-reflection layer 13 preferably contains the nanodiamond particles. The constitution wherein the anti-reflection layer 13 contains the nanodiamond particles, i.e., fine particles of diamond, which has extremely high mechanical strength, is suitable for achieving high scratch resistance in the anti-reflection layer 13 or the surface 13a thereof of the anti-reflection film X.

The anti-reflection layer 13 preferably contains a fluorine-containing curable compound, as described above. Such a constitution is preferred from the perspectives of, such as anti-smudge properties, water repellency, oil repellency, slipperiness, and ease of wiping a fingerprint on the exposed surface of the anti-reflection layer 13. In addition, the constitution in which the anti-reflection layer 13 contains a fluorine-containing curable compound is suitable for reducing the coefficient of kinetic friction and the coefficient of static friction on the surface 13a of the anti-reflection layer 13 and thus is suitable for achieving high scratch resistance in the anti-reflection layer 13 or the anti-reflection film X.

Figure 2:
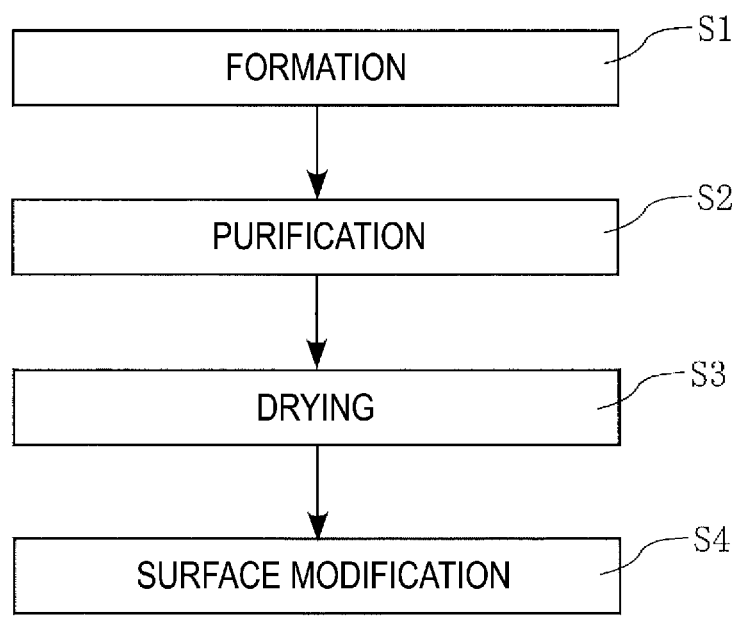
FIG. 2 is a flow diagram of an example of a method for producing surface-modified nanodiamond particles that can be used as a constituent of an anti-reflection layer of an anti-reflection film according to an embodiment of the present invention.

FIG. 2 is a flow diagram of an example of a method for producing the surface-modified nanodiamond particles that can be used as a constituent of the anti-reflection layer 13 or the composition for the anti-reflection layer. The present method includes formation S1, purification S2, drying S3, and surface modification S4.

In the formation S1, a detonation method is performed to form nanodiamond. First, a molded explosive attached with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume of the vessel is, for example, from 0.5 to 40 m³. A mixture of trinitrotoluene (TNT) and cyclotrimethylenetrinitramine, i.e., hexogen (RDX), can be used as the explosive. The mass ratio of TNT and RDX (TNT/RDX) is, for example, in a range of 40/60 to 60/40. The explosive is used in an amount, for example, from 0.05 to 2.0 kg.

In the formation S1, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive used partially causes incomplete combustion and releases free carbon, and nanodiamond is formed from the carbon as a raw material by the action of the pressure and energy of a shock wave generated in the explosion. The nanodiamond forms an aggregate first in a product obtained by the detonation method, and in the aggregate, adjacent primary particles or crystallites very firmly aggregate with each other by contribution of Coulomb interaction between crystal planes in addition to the action of Van der Waals forces.

In the formation S1, then the temperatures of the vessel and the inside of the vessel are reduced by allowing the vessel to stand at room temperature, for example, for 24 hours. After the cooling, a nanodiamond crude product (containing the aggregate of the nanodiamond particles formed as described above and soot), which adheres to the inner wall of the vessel, is scraped with a spatula, and the nanodiamond crude product is thereby collected. By the detonation method as described above, a crude product of the nanodiamond particles can be obtained. In addition, the desired amount of the nanodiamond crude product can be obtained by performing the formation S1 as described above a necessary number of times.

In the present embodiment, the purification S2 includes an acid treatment that allows a strong acid to act on the raw material nanodiamond crude product in a water solvent, for example. The nanodiamond crude product obtained by the detonation method is prone to containing a metal oxide, which is an oxide of a metal, such as Fe, Co, or Ni, derived from a vessel or the like used in the detonation method. The metal oxide can be dissolved and removed from the nanodiamond crude product by allowing a predetermined strong acid to act on the nanodiamond crude product (acid treatment) in a water solvent, for example. The strong acid used in the acid treatment is preferably a mineral acid, and examples of the strong acid include hydrochloric acid, hydrofluoric acid, sulfuric acid, nitric acid, and aqua regia. In the acid treatment, one strong acid may be used, or two or more strong acids may be used. The concentration of the strong acid used in the acid treatment is, for example, from 1 to 50 mass %. The acid treatment temperature is, for example, from 70 to 150° C. The duration of the acid treatment is, for example, from 0.1 to 24 hours. In addition, the acid treatment can be performed under reduced pressure, under normal pressure, or under increased pressure. After such an acid treatment, the solid (containing the nanodiamond aggregates) is washed with water, for example, by decantation. The solid is preferably repeatedly washed with water by decantation until the pH of the precipitation solution reaches, for example, 2 to 3.

The purification S2 in the present embodiment includes an oxidation treatment for removing graphite from the nanodiamond crude product (the nanodiamond aggregate prior to completion of the purification) using an oxidizing agent. The nanodiamond crude product obtained by the detonation method contains graphite (black lead). This graphite is derived from carbon that has not formed nanodiamond crystals among the carbon released when the explosive used has partially caused incomplete combustion. The graphite can be removed from the nanodiamond crude product, for example, by allowing a predetermined oxidizing agent to act thereon, for example, in a water solvent, for example, after the acid treatment described above. Examples of the oxidizing agent used in the oxidation treatment include sulfuric acid, nitric acid, chromic acid, chromic anhydride, dichromic acid, permanganic acid, and perchloric acid. In the oxidation treatment, one type of oxidizing agent may be used, or two or more types of oxidizing agents may be used. The concentration of the oxidizing agent used in the oxidation treatment is, for example, from 3 to 80 mass %. The oxidizing agent is used in the oxidation treatment in an amount, for example, from 300 to 500 parts by mass relative to 100 parts by mass of the nanodiamond crude product that is to be subjected to the oxidation treatment. The oxidation treatment temperature is, for example, from 100 to 200° C. The duration of the oxidation treatment is, for example, from 1 to 50 hours. The oxidation treatment can be performed under reduced pressure, under atmospheric pressure, or under increased pressure. After such oxidation treatment, the solid (containing the nanodiamond aggregate) is washed with water, for example, by decantation or centrifugal sedimentation. The supernatant liquid from the initial water washing is colored, and thus the water washing of the solid by decantation is preferably repeated until the supernatant liquid becomes visually transparent. The repeated water washing reduces or eliminates an impurity electrolyte (NaCl and the like). Low electrolyte concentration is suitable for achieving high dispersibility and high dispersion stability of the nanodiamond particles obtained by the present method.

After such oxidation treatment, the nanodiamond may be treated with an alkaline solution. The alkali treatment can convert an acidic functional group (for example, a carboxyl group) on the surface of the nanodiamond into a salt (for example, a carboxylate salt). Examples of the alkaline solution used include an aqueous sodium hydroxide solution. In the alkali treatment, the alkaline solution concentration is, for example, from 1 to 50 mass %, the treatment temperature is, for example, from 70 to 150° C., and the duration of the treatment is, for example, from 0.1 to 24 hours. In addition, after such alkali treatment, the nanodiamond may be treated with an acid solution. Through the acid treatment, the salt of the acidic functional group on the nanodiamond surface can be converted back to the free acidic functional group again. Examples of the acid solution used include hydrochloric acid. The acid treatment may be performed at room temperature or may be performed under heating. The solid of the nanodiamond (containing the nanodiamond aggregate) that has undergone the alkali treatment after the oxidation treatment and the subsequent acid treatment is washed with water, for example, by decantation or centrifugal sedimentation method.

In the present method, the drying S3 is then performed. In the drying S3, for example, the liquid is evaporated from a nanodiamond-containing solution obtained through the purification S2 using an evaporator (evaporation to dryness). The residual solid resulting from such evaporation to dryness may be further dried by heat drying in a drying oven. Through such drying S3, powder of the nanodiamond aggregate is obtained.

In the present method, the surface modification S4 is then performed. The surface modification S4 is for surface-modifying the nanodiamond particles contained in the nanodiamond aggregate obtained as described above by bonding a predetermined silane coupling agent to the nanodiamond particles. In the surface modification S4, first, a mixed solution containing, for example, the dried nanodiamond (the nanodiamond aggregate) obtained as described above, a silane coupling agent, and a solvent is stirred in a reaction vessel. Zirconia beads as disintegration media are then added to the mixed solution in the reaction vessel. The diameter of the zirconia beads is, for example, from 15 to 500 μm. The surface modification treatment is then performed on the nanodiamond in the solution using an ultrasonic generator equipped with an oscillator capable of oscillating an ultrasonic wave. Specifically, the tip of the oscillator of the ultrasonic generator is inserted into the reaction vessel and immersed in the solution, and an ultrasonic wave is generated from the oscillator. This treatment is preferably performed while the solution subjected to the treatment is cooled, for example, with ice water. The duration of such surface modification treatment is, for example, from 4 to 10 hours. The content ratio of the nanodiamond in the solution subjected to the present treatment is, for example, from 0.5 to 5 mass %, and the concentration of the silane coupling agent is, for example, from 5 to 40 mass %. Examples of the solvent to be used include tetrahydrofuran, acetone, methyl ethyl ketone, 1-methoxypropanol, methyl isobutyl ketone, isopropanol, or 2-butanol. In addition, the mass ratio of the nanodiamond and the silane coupling agent in the solution is, for example, from 2:1 to 1:10. In the present surface modification treatment, cavitation occurs in the solution subjected to ultrasonic irradiation based on the acoustic effect, and zirconia beads in the solution acquire extremely large kinetic energy by a jet blast generated when the cavitation (microbubbles) collapses. Then, the zirconia beads give impact energy to the nanodiamond aggregate in the same solution, the nanodiamond particles are thereby disintegrated from the nanodiamond aggregate (disintegration), and the silane coupling agent acts on the nanodiamond particles in a dissociated state to bond them. This bond is, for example, a covalent bond formed through a dehydration condensation reaction between the silanol group of the silane coupling agent and a surface hydroxyl group of the nanodiamond particles. When the silane coupling agent includes a hydrolyzable group, a silanol group can be formed even with slight moisture contained in the reaction system. The surface modification S4 as described above can produce the surface-modified nanodiamond particles containing the nanodiamond particles and the silane coupling agent bonded thereto, or a dispersion liquid thereof. If unreacted nanodiamond aggregate is present in the solution that has undergone the surface modification S4, the solution is allowed to stand, then the supernatant liquid is collected, and a surface-modified nanodiamond particle dispersion liquid containing a reduced amount of the unreacted nanodiamond aggregate can be thereby obtained. In addition, the resulting surface-modified nanodiamond particle dispersion liquid may be subjected to a solvent replacement procedure to change the solvent used in the surface modification S4 to another solvent.

For example, the surface-modified nanodiamond particle dispersion liquid produced as described above is mixed with the above curable resin-forming component, the low-refractive-index particles, and the like, and the above composition for forming anti-reflection layer can be thereby prepared.

EXAMPLES

Production of Dispersion Liquid of Surface-Modified Nanodiamond Particles

A dispersion liquid of surface-modified nanodiamond particles was produced through the process as follows.

First, the formation of nanodiamond by a detonation method was performed. In the present formation, first, a molded explosive attached with an electric detonator was placed inside a pressure-resistant vessel for detonation, and the vessel was sealed. The vessel is made of iron and has a capacity of 15 $m^3$. As the explosive, 0.50 kg of a mixture of TNT and RDX was used. The mass ratio of the TNT and RDX (TNT/RDX) in the explosive is 50/50. The electric detonator was then triggered to detonate the explosive in the vessel (formation of nanodiamond by detonation method). Then the temperatures of the vessel and the inside of the vessel were decreased by allowing the vessel to stand at room temperature for 24 hours. After the cooling, a nanodiamond crude product (containing the aggregate of the nanodiamond particles and soot formed in the above detonation method), which adhered to the inner wall of the vessel, was scraped with a spatula, and the nanodiamond crude product was thereby collected.

The nanodiamond crude product obtained by performing the formation as described above multiple times was then subjected to an acid treatment in the purification. Specifically, a slurry obtained by adding 6 L of a 10 mass % hydrochloric acid to 200 g of the nanodiamond crude product was subjected to a heat treatment under reflux at normal pressure conditions for 1 hour. The heating temperature in this acid treatment is from 85 to 100° C. Then, after cooling, the solid (containing the nanodiamond aggregates and soot) was washed with water by decantation. The solid was repeatedly washed with water by decantation until the pH of the precipitation solution reached 2 from the low pH side.

An oxidation treatment of the purification was then performed. Specifically, 6 L of 98 mass % sulfuric acid and 1 L of 69 mass % nitric acid were added to the precipitate solution (containing the nanodiamond aggregate) obtained through decantation after the acid treatment to form a slurry, and then the slurry was subjected to heat treatment under reflux at normal pressure conditions for 48 hours. The heating temperature in this oxidation treatment is from 140 to 160° C. Then, after cooling, the solid (containing the nanodiamond aggregates) was washed with water by decantation. The supernatant liquid from the initial water washing was colored, and thus the water washing of the solid by decantation was repeated until the supernatant liquid became visually transparent.

The precipitate solution (containing the nanodiamond aggregate) obtained through decantation after the oxidation treatment was then subjected to drying treatment and dried powder was obtained (the drying). As a technique for the drying treatment, evaporation to dryness performed by using an evaporator was adopted.

The surface modification was then performed. Specifically, first, 0.30 g of the nanodiamond powder obtained through the above drying was weighed into a 50-mL sample bottle, and the nanodiamond powder and a mixed solution of 14 g of a solvent, tetrahydrofuran (THF), and 1.2 g of a silane coupling agent, 3-(trimethoxysilyl)propyl acrylate (available from Tokyo Chemical Industry Co., Ltd.), were stirred for 10 minutes. Then 34 g of zirconia beads (trade name "YTZ", diameter 30 μm, available from Tosoh Corporation) were added to the solution. The mixed solution was then subjected to surface modification treatment using a homogenizer (trade name "Ultrasonic Disperser UH-6005", available from SMT Co., Ltd.) as an ultrasonic generator. Specifically, an ultrasonic wave was generated from an oscillator in a state where the tip of the oscillator of the ultrasonic generator was inserted into the reaction vessel and immersed in the solution, and the mixed solution in the reaction vessel was subjected to ultrasonic treatment for 8 hours while the reaction vessel was cooled with ice water. In this treatment, the solution initially having turbid gray color gradually increased transparency while becoming black. This is thought to be because nanodiamond particles were sequentially disintegrated from the nanodiamond aggregate (disintegration), the silane coupling agent acted on the nanodiamond particles in a dissociated state to bond them, and thus surface-modified nanodiamond particles were stably dispersed in the THF solvent. The particle size D50 of the nanodiamond dispersion liquid after 8 hours of the surface modification treatment was 15 nm as measured by the dynamic light scattering method as described below. As described above, the dispersion liquid of the surface-modified nanodiamond particles (surface-modified nanodiamond particles $ND_1$) was produced.

Example 1

A hard coat layer and an anti-reflection layer were sequentially formed on a substrate as follows to produce an anti-reflection film of Example 1.

Formation of Hard Coat Layer 61.6 parts by mass of an epoxy group-containing polysilsesquioxane obtained as described below, 6.9 parts by mass of an epoxy compound having an alicyclic epoxy group (trade name "EHPE3150", available from Daicel Corporation.), 30 parts by mass of methyl isobutyl ketone (MIBK) (available from Kanto Chemical Co., Inc.), and 0.5 parts by mass of a cationic photopolymerization initiator (trade name "CPI-210S", available from San-Apro Ltd.) were mixed to prepare a curable resin composition for forming a hard coat layer. Next, a 50 μm-thick polyethylene naphthalate (PEN) film (trade name "Teonex", available from Teijin Dupont Film Japan Limited.) as a transparent substrate was coated with the composition for forming the hard coat layer by using a wire bar #14 to form a coated film, and then the coated film was dried at 80° C. for 1 minute using a dryer. The film with the coated film was then subjected to ultraviolet light curing treatment using an ultraviolet irradiation device (the light source was a high-pressure mercury lamp, available from Ushio Inc.). The ultraviolet irradiation dose thereof is 400 mJ/$cm^2$. Next, the film was subjected to a heat treatment for 30 minutes at 150° C. using a dryer on the film that had undergone an ultraviolet curing treatment. In this way, a 10 μm thick hard coat layer (hard coat layer $HC_1$) was formed on the PEN film by a wet coating method.

Synthesis of Curable Resin for Hard Coat Layer 161.5 mmol (39.79 g) of 2-(3,4-epoxycyclohexyl) ethyltrimethoxysilane, 9 mmol (1.69 g) of phenyltrimethoxysilane, and 165.9 g of acetone as solvent were mixed in a 300-mL flask equipped with a reflux condenser, a nitrogen gas inlet tube, a stirrer, and a thermometer, and the temperature was raised to 50° C. Next, to the mixture, 4.7 g of a 5% potassium carbonate aqueous solution (1.7 mmol as potassium carbonate) was added dropwise over 5 minutes, and then 1700 mmol (30.6 g) of water was added for 20 minutes. No significant temperature rise occurred in the mixture during a drop wise operation. After the drop-wise operation, a polycondensation reaction was performed at 50° C. for 4 hours while nitrogen gas was introduced into the flask. After the polycondensation reaction, the product in the reaction solution was analyzed, and the number-average molecular weight was found to be 1911, and the molecular weight dispersity was found to be 1.47. Further, a $^{29}$Si-NMR spectrum was measured for this product, and the value of the molar ratio of T3 form to T2 form (T3 form/T2 form) in the product was calculated based on the $^{29}$Si-NMR spectrum, and the value was 10.3. The reaction solution cooled by standing was repeatedly washed with water until a lower layer solution (aqueous phase) generated by the phase separation became neutral, then an upper layer solution was removed, and the solvent was distilled off from the upper layer solution under the conditions of 1 mmHg and 40° C. until the amount of the solvent became 25 mass %, to obtain a colorless and transparent liquid product (epoxy group-containing polysilsesquioxane).

Formation of Anti-Reflection Layer

The supernatant liquid collected after the dispersion of the surface-modified nanodiamond particles $ND_1$ was allowed to stand for a whole day and night was added dropwise to a mixed solvent of 16 mL of toluene and 4 mL of hexane (the total amount of drop-wise addition was 10 mL). The mixed solvent after the drop-wise addition was subjected to centrifugation treatment (centrifugal force of 20000×g, centrifugation time of 10 minutes), and the precipitated solid (surface-modified nanodiamond particles $ND_1$) was collected. Tetrahydrofuran (THF) was added to thus collected solid to prepare a THF solution of the surface-modified nanodiamond particles $ND_1$ (solid concentration of 6.5 mass %), and the solution was ultrasonicated for 10 minutes using an ultrasonicator (trade name "ASU-10", available from AS ONE Corporation). The surface-modified nanodiamond particles $ND_1$ in the THF solution after the ultrasonication had a particle size D50 of 12 nm as measured by dynamic light scattering method as described below. On the other hand, the THF solution after the ultrasonication (containing the surface-modified nanodiamond particles $ND_1$ with a solid concentration of 6.5 mass %) and an anti-reflection coating (trade name "ELCOM P-5062", available from JGC Catalysts & Chemicals Ltd., the content ratio of hollow silica particles, which are low-refractive-index particles, is 1.65 mass %, the content ratio of a curable resin component is 1.35 mass %, and the total solid concentration is 3 mass %), a fluorine-containing curable compound solution (trade name "KY-1203", available from Shin-Etsu Chemical Co., Ltd., fluorine-containing acrylic compound, solid concentration of 20 mass %) were charged in a light-proof bottle in ratios of the solid of the THF solution of 9.09 parts by mass and the solid of the fluorine-containing curable compound solution of 13.94 parts by mass relative to 100 parts by mass of the hollow silica particles in the anti-reflection coating and mixed for 1 hour using an agitator. A first composition for forming the anti-reflection layer in which the surface-modified nanodiamond particles $ND_1$ was dispersed was thus prepared. The first composition for forming the anti-reflection layer was then coated on the hard coat layer $HC_1$ of the PEN film with the hard coat layer $HC_1$ using a bar coater #4 to form a coated film, and then the coated film was dried at 80° C. for 1 minute using a drier. The film with the coated film was then subjected to ultraviolet light curing treatment using an ultraviolet irradiation device (the light source was a high-pressure mercury lamp, available from Ushio Inc.) under a nitrogen atmosphere. The ultraviolet irradiation dose thereof was 200 mJ/cm². As a result, an anti-reflection layer (anti-reflection layer $AR_1$) having a thickness of 100 nm was formed on the hard coat layer $HC_1$. As described above, the anti-reflection film of Example 1 including a laminated structure of the PEN film, the hard coat layer $HC_1$, and the anti-reflection layer $AR_1$ was produced.

Example 2

An anti-reflection film of Example 2 was produced in the same manner as the anti-reflection film of Example 1 except that the thickness of the hard coat layer $HC_1$ to be formed was set to 30 μm instead of 10 μm using a wire bar #34 in place of the wire bar #14 during the hard coat layer forming process.

Example 3

An anti-reflection film of Example 3 was produced in the same manner as the anti-reflection film of Example 1 except that the thickness of the hard coat layer $HC_1$ to be formed was set to 40 μm instead of 10 μm using a wire bar #44 in place of the wire bar #14 during the hard coat layer forming process.

Example 4

The anti-reflection coating (trade name "ELCOM P-5062", available from JGC Catalysts & Chemicals Ltd., the content ratio of hollow silica particles, which are low-refractive-index particles, is 1.65 mass %, the content ratio of a curable resin component is 1.35 mass %, and the total solid concentration is 3 mass %), a dispersion liquid of hollow silica particles (trade name "Thrulya 4320", available from JGC Catalysts & Chemicals Ltd., content ratio or solid concentration of hollow silica particles is 20 mass %), in which the hollow silica particles were low-refractive-index particles, and isopropyl alcohol (IPA) were mixed in ratios of the solid of Thrulya 4320 of 30 parts by mass and IPA of 798 parts by mass relative to 100 parts by mass of the hollow silica particles in the anti-reflection coating. The content ratio of the hollow silica particles in this mixed liquid is 1.83 mass %, the content ratio of the curable resin component is 1.17 mass %, and the total solid concentration is 3 mass %. Then this mixed liquid, the nanodiamond-containing THF solution after the ultrasonication (containing the surface-modified nanodiamond particles $ND_1$ with a solid concentration of 6.5 mass %) described above for Example 1, and the fluorine-containing curable compound solution (trade name "KY-1203", available from Shin-Etsu Chemical Co., Ltd., fluorine-containing acrylic compound, solid concentration of 20 mass %) were charged in a light-proof bottle in ratios of the solid of the THF solution of 4.92 parts by mass and the solid of the fluorine-containing curable compound solution of 10.38 parts by mass relative to 127.8 parts by mass of the hollow silica particles in the above mixed liquid and mixed for 1 hour using an agitator. A second composition for forming the anti-reflection layer in which the surface-modified nanodiamond particles $ND_1$ was dispersed was thus prepared. An anti-reflection film of Example 4 was produced in the same manner as the anti-reflection film of Example 1 except that the second composition for forming the anti-reflection layer was used in place of the first composition for forming the anti-reflection layer described above to form the anti-reflection layer $AR_2$ instead of the anti-reflection layer $AR_1$ on the hard coat layer $HC_1$. The anti-reflection film of Example 4 has a laminated structure of a PEN film, a hard coat layer $HC_1$ (thickness of 10 μm), and an anti-reflection layer $AR_2$ (thickness of 100 nm).

Example 5

An anti-reflection film of Example 5 was produced in the same manner as the anti-reflection film of Example 4 except that the thickness of the hard coat layer $HC_1$ to be formed was set to 30 μm instead of 10 μm using a wire bar #34 in place of the wire bar #14 during the hard coat layer forming process.

Example 6

An anti-reflection film of Example 6 was produced in the same manner as the anti-reflection film of Example 4 except that the thickness of the hard coat layer $HC_1$ to be formed was set to 40 μm instead of 10 μm using a wire bar #44 in place of the wire bar #14 during the hard coat layer forming process.

Comparative Example 1

An anti-reflection film of Comparative Example 1 was produced in the same manner as the anti-reflection film of Example 1 except that the anti-reflection layer $AR_3$ is formed instead of the anti-reflection layer $AR_1$ on the hard coat layer $H_1$. In forming the anti-reflection layer $AR_3$, a silicon dioxide layer (thickness of 15 nm) and a niobium pentoxide layer (thickness of 10 nm), a silicon dioxide layer (thickness of 35 nm), a niobium pentoxide layer (thickness of 100 nm), and a silicon dioxide layer (thickness of 80 nm) were formed on the hard coat layer $HC_1$ by a sputtering method as one of dry coating methods. The surface of the anti-reflection layer $AR_3$ was coated with a fluorine-containing compound solution (trade name "Optool DSX", available from Daikin Chemicals) and then dried at 100° C. to form an antifouling layer (thickness of 8 nm).

Comparative Example 2

An anti-reflection film of Comparative Example 2 was produced in the same manner as the anti-reflection film of Comparative Example 1 except that the thickness of the hard coat layer $HC_1$ to be formed was set to 30 μm instead of 10 μm using a wire bar #34 in place of the wire bar #14 during the hard coat layer forming process.

Comparative Example 3

An anti-reflection film of Comparative Example 3 was produced in the same manner as the anti-reflection film of Comparative Example 1 except that the thickness of the hard coat layer $HC_1$ to be formed was set to 40 μm instead of 10 μm using a wire bar #44 in place of the wire bar #14 during the hard coat layer forming process.

Measurement of Particle Size D50

The particle size D50 of the surface-modified nanodiamond particles contained in the surface-modified nanodiamond particle dispersion liquid is a particle size at 50% integrated value obtained from particle size distribution measured by dynamic light scattering method (non-contact backscattering method) using an instrument available from Malvern Instruments Ltd. (trade name "ZetaSizer Nano ZS").

Luminous Reflectance

For each of the anti-reflection films of Examples 1 to 6 and Comparative Examples 1 to 3, an optically clear adhesive (OCA) was adhered to the surface on the opposite side of the anti-reflection layer to form an adhesive surface, and a black acrylic plate was adhered to this adhesive surface to produce a sample for measurement. Then, a luminous reflectance (%) was measured on the anti-reflection layer side surface of the sample for measurement produced from each of the anti-reflection films of Examples 1 to 6 and Comparative Examples 1 to 3 using a reflectance spectrophotometer (trade name "UH-3900", available from Hitachi High-Technologies Corporation). The present measurement was performed in accordance with JIS Z 8701. The results are listed in Table 1.

Total Light Transmittance

A total light transmittance (%) was measured for each of the anti-reflection films of Examples 1 to 6 and Comparative Examples 1 to 3 using a total light transmittance measuring apparatus (trade name "NDH-5000W", available from Nippon Denshoku Industries Co., Ltd.). The present measurement was performed in accordance with JIS K 7105. Similarly, the total light transmittance (%) was measured for each of the anti-reflection films of Examples 1 to 6 and Comparative Examples 1 to 3 that had undergone rubbing test described below. These results are listed in Table 1.

Haze

A haze value (%) was measured for each of the anti-reflection films of Examples 1 to 6 and Comparative Examples 1 to 3 using a haze measuring apparatus (trade name "NDH-5000W", available from Nippon Denshoku Industries Co., Ltd.). The present measurement was performed in accordance with JIS K 7136. Similarly, the haze value (%) was measured for each of the anti-reflection films of Examples 1 to 6 and Comparative Examples 1 to 3 that had undergone the rubbing test described below. These results are listed in Table 1.

Bending Resistance: Cylindrical Mandrel Method

For each anti-reflection film of Examples 1 to 6 and Comparative Examples 1 to 3, a cylindrical mandrel bending tester (trade name "bending tester (cylindrical mandrel method)", available from TP Giken Co., Ltd.) and a cylindrical mandrel method in accordance with JIS K 5600-5-1 were used to examine the bending resistance as follows (the used tester was equipped with 12 replaceable mandrels having mandrel diameters of 2 mm, 3 mm, 4 mm, 5 mm, 6 mm, 8 mm, 10 mm, 12 mm, 16 mm, 20 mm, 25 mm, and 32 mm).

In the bending test (first bending test) by a cylindrical mandrel method in which a test piece (15 mm×150 mm) cut out of an anti-reflection film is bent with the anti-reflection layer side inward, the minimum value of the mandrel diameter (mm) at which the test piece exhibited bending resistance without cracking was examined. In each first bending test, the film to be tested is subjected to 180° bending deformation around the mandrel along the circumferential surface of the mandrel, which is a core rod having a predetermined diameter in a manner that the hard coat layer and the anti-reflection layer are positioned inside the substrate.

In addition, in the bending test (second bending test) by a cylindrical mandrel method in which a test piece (15 mm×150 mm) cut out of an anti-reflection film is bent with the anti-reflection layer side outward, the minimum value of the mandrel diameter (mm) at which the test piece exhibited bending resistance without cracking was examined. In each second bending test, the film to be tested is subjected to 180° bending deformation around the mandrel along the circumferential surface of the mandrel, which is a core rod having a predetermined diameter in a manner that the hard coat layer and the anti-reflection layer are positioned outside the substrate.

Bending Resistance: Continuous Bending Test

For each anti-reflection film of Examples 1 to 6 and Comparative Examples 1 to 3, the bending resistance when bending was repeated was examined as follows using a continuous bending tester (trade name "Tension Free U-shape Folding Test Machine DLDM111LHB", available from Yuasa System Co., Ltd.).

A bending test of 100 cycles was performed for test pieces (width 100 mm×length 150 mm) cut out from the anti-reflection film under the conditions of 50 r/min test speed (50 cycles per minute) (first continuous bending test). Each cycle of the first continuous bending test includes a bending motion of the test piece in which both ends in the length direction of the test piece approach each other until the center in the lengthwise direction of the test piece bends at a predetermined minimum curvature radius with the anti-reflection layer side inward, and a returning motion of the test piece in which the both ends are separated and the test piece returns to the original flat film shape. After 100 cycles, the test piece was examined for a minimum curvature radius at the time of bending, which indicates the bending resistance without cracking. The results are listed in Table 1 as the 2-fold value of the minimum curvature radius (mm) at the time of bending indicating the bending resistance (corresponding to the minimum value of the diameter according to the bending resistance).

In addition, a bending test of 100 cycles was performed for test pieces (width 100 mm×length 150 mm) cut out from the anti-reflection film under the conditions of 50 r/min test speed (50 cycles per minute) (second continuous bending test). Each cycle of the second continuous bending test includes a bending motion of the test piece in which both ends in the length direction of the test piece approach each other until the center in the lengthwise direction of the test piece bends at a predetermined minimum curvature radius with the anti-reflection layer side outward, and a returning motion of the test piece in which the both ends are separated and the test piece returns to the original flat film shape. After 100 cycles, the test piece was examined for a minimum curvature radius at the time of bending, which indicates the bending resistance without cracking. The results are listed in Table 1 as the 2-fold value of the minimum curvature radius (mm) at the time of bending indicating the bending resistance (corresponding to the minimum value of the diameter according to the bending resistance).

Pencil Hardness

For each anti-reflection layer side surface of each of the anti-reflection films of Examples 1 to 6 and Comparative Examples 1 to 3, the pencil hardness was measured using a pencil scratch hardness tester (trade name "No. 553-M", available from Yasuda Seiki Seisakusho, Ltd.). The present measurement was performed in accordance with JIS K 5600-5-4. The results are listed in Table 1.

Rubbing Test

The anti-reflection layer side surface of each of the anti-reflection films of Examples 1 to 6 and Comparative Examples 1 to 3 was subjected to rubbing test using a rubbing tester and using steel wool #0000 (available from Nihon Steel Wool Co., Ltd.) as a rubbing material that was reciprocated on the surface to be tested. The present test is performed under a test environment at 23° C. and 50% RH, with a load of the rubbing material on the surface to be tested of 200 g/cm$^2$, a length of travel of the rubbing material on the surface to be tested (rubbing stroke length) of 10 cm, and reciprocations of the rubbing material on the surface to be tested of 1000 times.

The total light transmittance (%) and the haze value (%) measured for each of the anti-reflection films of Examples 1 to 6 and Comparative Examples 1 to 3 that had undergone such a rubbing test are as listed in Table 1. For these values, changes from values before the rubbing test are also listed in Table 1.

In addition, for each of the anti-reflection films of Examples 1 to 6 and Comparative Examples 1 to 3 that had undergone the rubbing test, the back surface of the film was painted over with a black marker pen, and then the degree of the scratch in the rubbed portion on the anti-reflection layer side surface was visually observed using reflected light. Then the appearance of the anti-reflection layer side surface was evaluated for each of the anti-reflection films of Examples 1 to 6 and Comparative Examples 1 to 3 that had undergone the rubbing test based on the following evaluation criteria. Excellent: no scratches were observed even if carefully observed. Good: up to 5 scratches were observed when carefully observed. Poor: scratches were clearly visible. The results are listed in Table 1.

Evaluation

All of the anti-reflection films of Examples 1 to 6 exhibited a total light transmittance of 93.5% or more, a haze of 0.8% or less, and a luminous reflectance of 1.1% or less, and exhibited higher bending resistance than that of the anti-reflection film of Comparative Examples 1 to 3 in the first and second bending tests described above and the first and second continuous bending tests described above.

TABLE 1

|  |  | Example 1 | Example 2 | Example 3 | Example 4 | Example 5 | Example 6 |
| --- | --- | --- | --- | --- | --- | --- | --- |
| Transparent substrate | | PEN | PEN | PEN | PEN | PEN | PEN |
| Hard coat layer | | $HC_1$ | $HC_1$ | $HC_1$ | $HC_1$ | $HC_1$ | $HC_1$ |
| [Thickness (μm)] | | [10] | [30] | [40] | [10] | [30] | [40] |
| Anti-reflection layer | | $AR_1$ | $AR_1$ | $AR_1$ | $Ar_2$ | $Ar_2$ | $Ar_2$ |
| [Coating method] | | [Wet] | [Wet] | [Wet] | [Wet] | [Wet] | [Wet] |
| Total light transmittance (%) | | 93.5 | 93.5 | 93.5 | 94.0 | 94.0 | 94.0 |
| Haze value (%) | | 0.8 | 0.8 | 0.8 | 0.8 | 0.8 | 0.8 |
| Luminous reflectance of anti-reflection layer side (%) | | 1.1 | 1.1 | 1.1 | 0.3 | 0.3 | 0.3 |
| Bending resistance | First bending test (cylindrical mandrel method) | 2 | 2 | 2 | 2 | 2 | 2 |
| | Second bending test (cylindrical mandrel method) | 5 | 5 | 5 | 5 | 5 | 5 |
| | First continuous bending test | 2 | 2 | 2 | 2 | 2 | 2 |
| | Second continuous bending test | 5 | 5 | 5 | 5 | 5 | 5 |

TABLE 1-continued

| | | | | | | |
|---|---|---|---|---|---|---|
| Pencil hardness | 2H | 5H | 9H | 2H | 5H | 9H |
| After rubbing test — Total light transmittance (%) | 93.5 | 93.5 | 93.5 | 94.0 | 94.0 | 94.0 |
| [Change in total light transmittance] | [0.0] | [0.0] | [0.0] | [0.0] | [0.0] | [0.0] |
| Haze value (%) | 0.8 | 0.8 | 0.8 | 0.8 | 0.8 | 0.8 |
| [Change in haze value] | [0.0] | [0.0] | [0.0] | [0.0] | [0.0] | [0.0] |
| Appearance evaluation | Excellent | Excellent | Excellent | Excellent | Excellent | Excellent |

| | | Comparative Example 1 | Comparative Example 2 | Comparative Example 3 |
|---|---|---|---|---|
| Transparent substrate | | PEN | PEN | PEN |
| Hard coat layer | | $HC_1$ | $HC_1$ | $HC_1$ |
| [Thickness (μm)] | | [10] | [30] | [40] |
| Anti-reflection layer | | $Ar_3$ | $Ar_3$ | $Ar_3$ |
| [Coating method] | | [Dry] | [Dry] | [Dry] |
| Total light transmittance (%) | | 94.0 | 94.0 | 94.0 |
| Haze value (%) | | 0.8 | 0.8 | 0.8 |
| Luminous reflectance of anti-reflection layer side (%) | | 0.3 | 0.3 | 0.3 |
| Bending resistance | First bending test (cylindrical mandrel method) | 8 | 8 | 8 |
| | Second bending test (cylindrical mandrel method) | 12 | 12 | 12 |
| | First continuous bending test | 10 | 10 | 10 |
| | Second continuous bending test | 16 | 16 | 16 |
| Pencil hardness | | 2H | 5H | 9H |
| After rubbing test | Total light transmittance (%) | 93.7 | 93.7 | 93.6 |
| | [Change in total light transmittance] | [−0.3] | [−0.3] | [0.4] |
| | Haze value (%) | 1.2 | 1.2 | 1.3 |
| | [Change in haze value] | [+0.4] | [+0.4] | [+0.5] |
| | Appearance evaluation | Poor | Poor | Poor |

To summarize the above, the constitutions and variations of the present invention are listed below as addenda.

[Addendum 1]

An anti-reflection film, including a laminated structure including:

a substrate;

an anti-reflection layer that contains a curable resin and low-refractive-index particles; and a hard coat layer positioned between the substrate and the anti-reflection layer and containing a curable resin, wherein a luminous reflectance of the anti-reflection layer side is 2% or less, preferably 1.7% or less, more preferably 1.5% or less, and more preferably 1.3% or less, and a minimum value of a mandrel diameter indicating bending resistance is in a range of 6 mm or less, preferably 5 mm or less, more preferably 4 mm or less, and more preferably 3 mm or less in a bending test according to a cylindrical mandrel method in which the test piece of the anti-reflection film is bent with the anti-reflection layer side inward, and additionally or alternatively, the minimum value of the mandrel diameter indicating bending resistance is in a range of 10 mm or less, and preferably in the range of 8 mm or less in a bending test according to a cylindrical mandrel method in which the test piece of the anti-reflection film is bent with the anti-reflection layer side outward.

[Addendum 2]

The anti-reflection film according to Addendum 1, wherein the haze is 1% or less, preferably 0.8% or less, more preferably 0.6% or less, more preferably 0.4% or less, and more preferably 0.2% or less.

[Addendum 3]

The anti-reflection film according to Addendum 1 or 2, wherein a total light transmittance is 93% or more, preferably 93.9% or more, and more preferably 94% or more.

[Addendum 4]

The anti-reflection film according to any one of Addenda 1 to 3, wherein after a rubbing test performed on the surface of the anti-reflection layer side using steel wool #0000 as a rubbing material under conditions of a load of 200 g/cm², a rubbing stroke length of 10 cm, and reciprocations of 1000 times, a difference of the haze value (%) after the rubbing test from the haze value (%) before the rubbing test is 0.1 or less and preferably 0.

[Addendum 5]

The anti-reflection film according to Addendum 4, wherein the haze after the rubbing test is 1% or less, preferably 0.8% or less, more preferably 0.6% or less, more preferably 0.4% or less, and more preferably 0.2% or less.

[Addendum 6]

The anti-reflection film according to Addendum 4 or 5, wherein a total light transmittance after the rubbing test is 93% or more, preferably 93.9% or more, and more preferably 94% or more.

[Addendum 7]

The anti-reflection film according to any one of Addenda 1 to 6, wherein a pencil hardness of the surface of the anti-reflection layer side is 2H or more, preferably 3H or more, and more preferably 4H or more.

[Addendum 8]

The anti-reflection film according to any one of Addenda 1 to 7, wherein a 2-fold value of a minimum value of a curvature radius at a bent portion that indicates the bending resistance is less than 10 mm, preferably 8 mm or less, more preferably 6 mm or less, more preferably 4 mm or less, and more preferably 3 mm or less in a bending test in which bending is performed 100 times continuously with a constant curvature radius at the bent portion with the anti-reflection layer side of the anti-reflection film test piece inward, and additionally or alternatively, a 2-fold value of a minimum value of a curvature radius at a bent portion that indicates the bending resistance is less than 16 mm, preferably 12 mm or less, more preferably 8 mm or less, and more preferably 6 mm or less in a bending test in which bending is performed 100 times continuously with a constant curvature radius at the bent portion with the anti-reflection layer side of the anti-reflection film test piece outward.

[Addendum 9]

The anti-reflection film according to any one of Addenda 1 to 8, wherein the hard coat layer contains a curable polyorganosilsesquioxane resin as the curable resin.

[Addendum 10]

The anti-reflection film according to Addendum 9, wherein the curable polyorganosilsesquioxane resin is an epoxy group-containing polysilsesquioxane.

[Addendum 11]

The anti-reflection film according to any one of Addenda 1 to 10, wherein the anti-reflection layer contains hollow silica particles.

[Addendum 12]

The anti-reflection film according to any one of Addenda 1 to 11, wherein the anti-reflection layer contains nanodiamond particles.

[Addendum 13]

The anti-reflection film according to Addendum 12, wherein a particle size D50 of the nanodiamond particles is 100 μm or less, and preferably 30 μm or less.

[Addendum 14]

The anti-reflection film according to Addendum 12 or 13, wherein a content ratio of the nanodiamond particles in the anti-reflection layer is from 0.1 to 15 mass % and preferably from 0.5 to 10 mass %.

[Addendum 15]

The anti-reflection film according to any one of Addenda 1 to 14, wherein the anti-reflection layer contains a fluorine-containing curable compound.

[Addendum 16]

The anti-reflection film according to any one of Addenda 1 to 15, wherein a thickness of the substrate is 400 μm or less, preferably 200 μm or less, and more preferably 100 μm or less.

[Addendum 17]

The anti-reflection film according to any one of Addenda 1 to 16, wherein a thickness of the hard coat layer is from 1 to 30 μm, and is preferably 3 to 10 μm.

[Addendum 18]

The anti-reflection film according to any one of Addenda 1 to 17, wherein a thickness of the anti-reflection layer is from 0.07 to 0.13 μm, and preferably from 0.08 to 0.12 μm.

[Addendum 19]

The anti-reflection film according to any one of Addenda 1 to 18, wherein an average particle size of the low-refractive-index particles is from 50 to 70 nm.

[Addendum 20]

The anti-reflection film according to any one of Addenda 1 to 19, wherein a content ratio of the low-refractive-index particles in the anti-reflection layer is from 10 to 90 mass % and preferably from 30 to 70 mass %.

REFERENCE SIGNS LIST

X Anti-reflection film
11 Substrate
12 Hard coat layer
13 anti-reflection layer
13a Surface

The invention claimed is:

1. An anti-reflection film, comprising a laminated structure including:
   a transparent resin film;
   a cured anti-reflection layer that is formed from a curable resin and contains low-refractive-index particles and nanodiamond particles; and
   a cured hard coat layer that is positioned between the transparent resin film and the anti-reflection layer formed form a curable resin,
   wherein a mass ratio of the low-refractive-index particles to the nanodiamond particles in the anti-reflection layer is in a range from 99:1 to 84:16;
   wherein the transparent resin film consists essentially of at least one resin film selected group consisting of a cellulose acetate film, a polyester film, a polycarbonate film, a polynorbornene film, a polyimide film, a polyamide film, a polyamide-imide film, a polyetherimide film, a polyarylate film, a polyetherketone film, and a polyetheretherketone film,
   wherein the thickness of the transparent resin film is 100 μm or less,
   a luminous reflectance of the anti-reflection layer side is 2% or less, and
   a minimum value of a mandrel diameter indicating bending resistance is in a range of 6 mm or less in a bending test according to a cylindrical mandrel method in which the test piece of the anti-reflection film is bent with the anti-reflection layer side inward, and additionally or alternatively, the minimum value of the mandrel diameter indicating bending resistance is in a range of 10 mm or less in a bending test according to a cylindrical mandrel method in which the test piece of the anti-reflection film is bent with the anti-reflection layer side outward, wherein
   the curable resin for the cured hard coat layer comprises a curable polyorganosilsesquioxane resin.

2. The anti-reflection film according to claim 1, wherein a haze is 1% or less.

3. The anti-reflection film according to claim 1, wherein after a rubbing test performed on the surface of the anti-reflection layer side using steel wool #0000 as a rubbing material under conditions of a load of 200 g/cm$^2$, a rubbing stroke length of 10 cm, and reciprocations of 1000 times, a difference of a haze value (%) from a haze value (%) before the rubbing test is 0.1 or less.

4. The anti-reflection film according to claim 3, wherein the haze after the rubbing test is 1% or less.

5. The anti-reflection film according to claim 3, wherein a total light transmittance after the rubbing test is 93% or more.

6. The anti-reflection film according to claim 1, wherein a pencil hardness of the surface of the anti-reflection layer side is 2 H or more.

7. The anti-reflection film according to claim 1, wherein a 2-fold value of a minimum value of a curvature radius at a bent portion that indicates the bending resistance is less than 10 mm in a bending test in which bending is performed 100 times continuously with a constant curvature radius at the bent portion with the anti-reflection layer side of the anti-reflection film test piece inward, and additionally or alternatively, a 2-fold value of a minimum value of a curvature radius at a bent portion that indicates the bending resistance is less than 16 mm in a bending test in which bending is performed 100 times continuously with a constant curvature radius at the bent portion with the anti-reflection layer side of the anti-reflection film test piece outward.

8. The anti-reflection film according to claim 1, wherein the anti-reflection layer contains hollow silica particles.

9. The anti-reflection film according to claim 1, wherein the anti-reflection layer is formed from a fluorine-containing curable compound.

10. The anti-reflection film according to claim 1, wherein a total light transmittance is 93% or more.

11. The anti-reflection film according to claim 1, wherein the curable polyorganosilsesquioxane resin is an epoxy group-containing polysilsesquioxane.

12. The anti-reflection film according to claim 1, wherein a particle size D50 of the nanodiamond particles is 100 nm or less.

13. The anti-reflection film according to claim 1, wherein a content ratio of the nanodiamond particles in the anti-reflection layer is from 0.1 to 15 mass %.

14. The anti-reflection film according to claim 1, wherein a thickness of the hard coat layer is from 1 to 30 μm.

15. The anti-reflection film according to claim 1, wherein a thickness of the anti-reflection layer is from 0.07 to 0.13 μm.

16. The anti-reflection film according to claim 1, wherein an average particle size of the low-refractive-index particles is from 50 to 70 nm.

17. The anti-reflection film according to claim 1, wherein a content ratio of the low-refractive-index particles in the anti-reflection layer is from 10 to 90 mass %.

18. The anti-reflection film according to claim 1, wherein a thickness of the hard coat layer is from 10 to 30 μm.

19. The anti-reflection film according to claim 1, wherein the thickness of the transparent resin film is 50 μm or less.

\* \* \* \* \*